United States Patent
Findikoglu et al.

(10) Patent No.: US 11,226,281 B1
(45) Date of Patent: Jan. 18, 2022

(54) NON-INVASIVE, IN SITU DIAGNOSIS AND MONITORING OF CORROSION IN HIGH TEMPERATURE SYSTEMS

(71) Applicant: Triad National Security, LLC, Los Alamos, NM (US)

(72) Inventors: Alp Tugrul Findikoglu, Los Alamos, NM (US); George Scott Goff, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 126 days.

(21) Appl. No.: 16/822,694

(22) Filed: Mar. 18, 2020

Related U.S. Application Data

(60) Provisional application No. 62/819,872, filed on Mar. 18, 2019.

(51) Int. Cl.
*G01N 29/24* (2006.01)
*G01N 29/07* (2006.01)
(Continued)

(52) U.S. Cl.
CPC ........... *G01N 17/043* (2013.01); *G01N 29/07* (2013.01); *G01N 29/2437* (2013.01);
(Continued)

(58) Field of Classification Search
CPC .. G01N 17/043; G01N 29/2437; G01N 29/07; G01N 29/46; G01N 2291/023;
(Continued)

(56) References Cited

U.S. PATENT DOCUMENTS

| 5,378,991 A | * | 1/1995 | Anderson ............... G01M 3/16 324/557 |
| 5,526,689 A | * | 6/1996 | Coulter .................. G01N 29/11 73/1.82 |

(Continued)

FOREIGN PATENT DOCUMENTS

| CA | 2671083 | * | 6/2008 | ............. G01R 27/04 |
| CA | 002912802 A1 | * | 12/2014 | ......... G01N 29/2475 |

(Continued)

OTHER PUBLICATIONS

"Basic Research Needs for Future Nuclear Energy", U.S. Department of Energy, Office of Science, https://science.energy.gov/~/media/bes/pdf/brochures/2017/Future_Nuclear_Energy_ Brochure.pdf.

(Continued)

*Primary Examiner* — Jacques M Saint Surin
(74) *Attorney, Agent, or Firm* — LeonardPatel PC; Michael A. Leonard, II; Sheetal S. Patel

(57) ABSTRACT

Techniques for non-invasive diagnosis and/or monitoring of corrosion in high temperature systems using specialized sensors that produce multi-mode acoustic signals in situ for accurate determination of wall loss and/or physical property changes for a vessel in contact with a high temperature, highly corrosive substance are disclosed. Sensitivity of a few microns (or about 0.1%) of wall loss, detection of changes in physical properties of vessel contents (e.g., approximately 1%), or both, at temperatures of 500° C., 600° C., or higher may be realized. Corrosion may be identified and/or monitored using time domain, frequency domain, or mixed time domain and frequency domain analysis of signal characteristics, signal delay, or both, for relatively short circumferential acoustic wave propagation (e.g., (Continued)

a few inches), as well as relatively long axial acoustic wave propagation (e.g., tens of feet).

20 Claims, 22 Drawing Sheets

(51) Int. Cl.
  *G01N 29/46* (2006.01)
  *G01N 17/04* (2006.01)
(52) U.S. Cl.
  CPC ....... *G01N 29/46* (2013.01); *G01N 2291/011* (2013.01); *G01N 2291/023* (2013.01); *G01N 2291/028* (2013.01); *G01N 2291/048* (2013.01); *G01N 2291/102* (2013.01)
(58) Field of Classification Search
  CPC ....... G01N 2291/028; G01N 2291/048; G01N 2291/102; G01N 2291/011
  USPC .......................................................... 73/579
  See application file for complete search history.

(56) References Cited

U.S. PATENT DOCUMENTS

| | | | | |
|---|---|---|---|---|
| 6,595,059 B2* | 7/2003 | Gorman | ............... | G01N 17/006 73/290 R |
| 8,285,495 B2* | 10/2012 | Purekar | ................ | G01N 29/075 702/39 |
| 10,473,625 B2 | 11/2019 | Findikoglu et al. | | |
| 2007/0159187 A1* | 7/2007 | Chen | ...................... | G01N 17/04 324/700 |
| 2018/0231501 A1 | 8/2018 | Findikoglu et al. | | |

FOREIGN PATENT DOCUMENTS

| | | | | | |
|---|---|---|---|---|---|
| CN | 209979458 U | * | 1/2020 | ............. | G01N 17/00 |
| CN | 212514186 | * | 2/2021 | ............. | G01N 17/00 |
| WO | 2017099852 A1 | | 6/2017 | | |

OTHER PUBLICATIONS

"Industrial Radiography", GE Inspection Technologies, https://www.gemeasurement.com/sites/gemc.dev/files/industrial_radiography_image_forming_techniques_english_4.pdf.

"Molten Salt Chemistry: Innovative Approaches to Accelerate Molten Salt Reactor Development and Deployment", Molten Salt Chemistry Workshop, Report for the US Department of Energy, Office of Nuclear Energy Workshop, Oak Ridge National Laboratory.

"Terrestrial Energy to Submit Design Certification to NRC for a Molten Salt Reactor in 2019", Neutron Bytes, Jan. 29, 2017, https://neutronbytes.com/2017/01/29/terrestrial-energy-to-submit-design-certification-to-nrc-for-a-molten-salt-reactor-in-2019/.

"Transducer Crystals", Boston Piezo Optics, Inc., http://www.bostonpiezooptics.com/transducer-crystals.

Baba, A., et al., "High Temperature Ultrasonic Transducer Up to 1000° C. Using Lithium Niobate Single Crystal," Appl. Phys. Lett 97, 232901 (2010).

Budimir, et al., "High Temperature NDE Ultrasound Transducers for Condition Monitoring of Superheated Steam Pipes in Nuclear Power Plants", 20th International Conference Nuclear Energy for New Europe 2011, Bovec Slovenia, Sep. 12-15, 2011.

Cegla, F.B., et al., "High-Temperature (>500° C.) Wall Thickness Monitoring Using Dry Coupled Ultrasonic Waveguide Transducers," IEEE Trans. Ultrason. Ferroelectr. Freq. Control. 58(1) 156 (2011). doi: 10.1109/TUFFC.2011.1782.

Cheong, et al., "High-Temperature Ultrasonic Thickness Monitoring for Pipe Thinning in a Flow-Accelerated Corrosion Proof Test Facility", Nuclear Engineering and Technology, 49 (2017) 1463-1471.

Environetix: EVHT-300: Wireless Microwave Acoustic Temperature Sensor System, www.environetix.com.

GPIMS, Guided Ultrasonics Ltd.; https://www.guided-ultrasonics.com.

http://www.world-nuclear.org/information-library/current-and-future-generation/molten-salt-reactors.aspx.

Kostan, et al., "High Temperature Gallium Orthophosphate Transducers for NDT," Procedia Eng. 168, 987 (2016).

Zou, et al, "High Accuracy Ultrasonic Corrosion Rate Monitoring", NACE International, Corrosion Conference & Expo, 2017, Paper 8990, https://researchgate.net/publication/320251777.

* cited by examiner

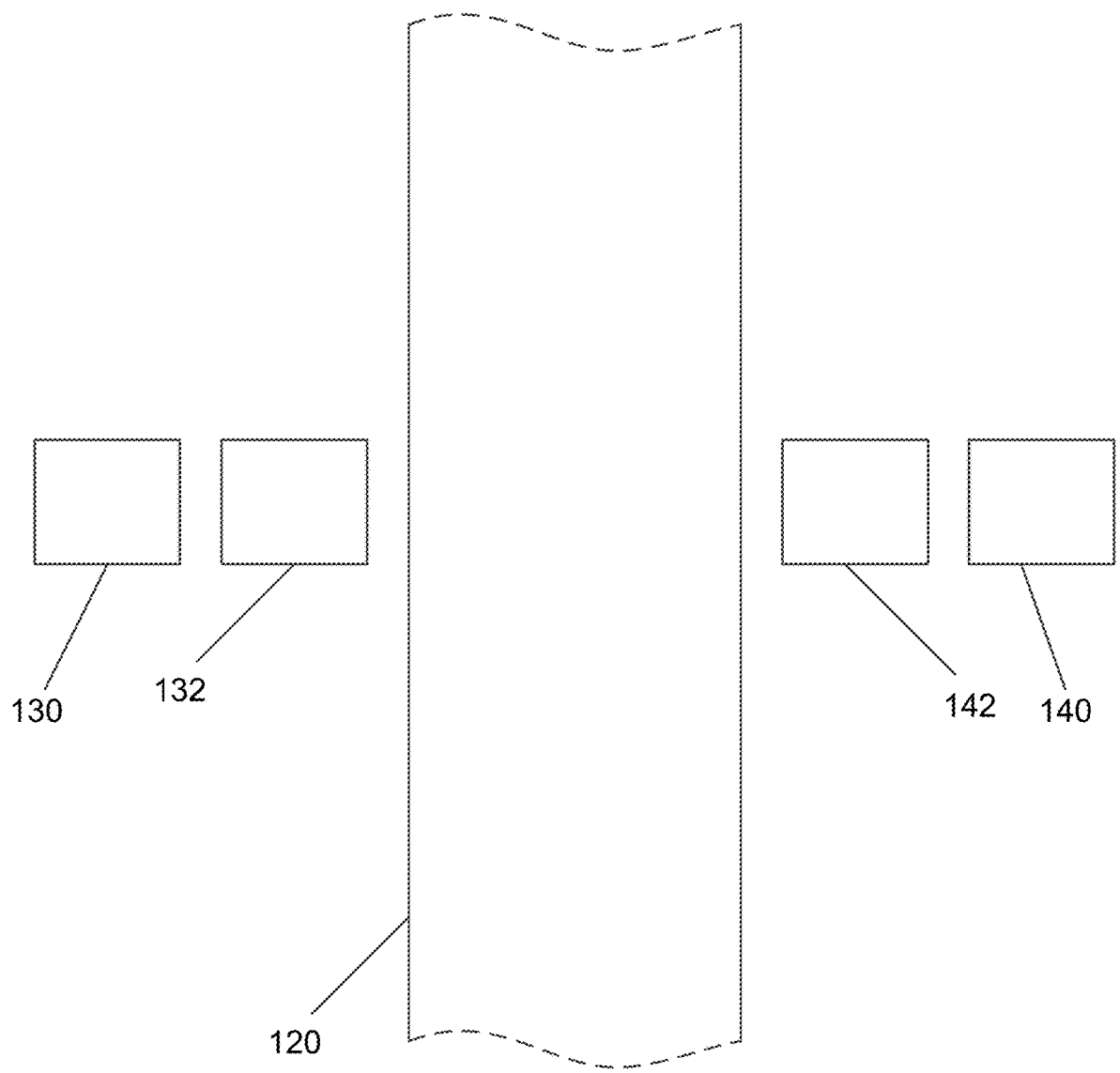

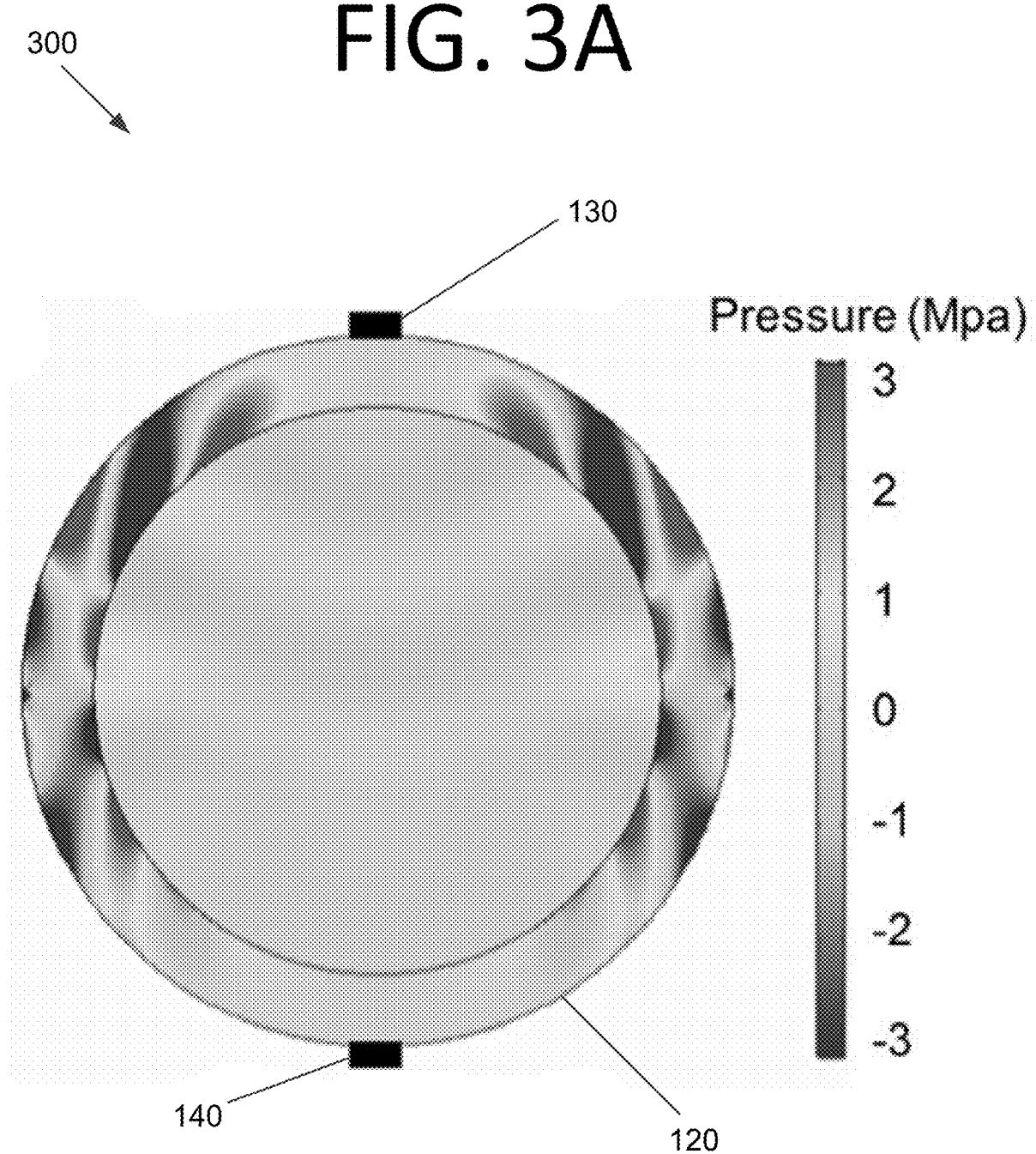

310

FIG. 3D
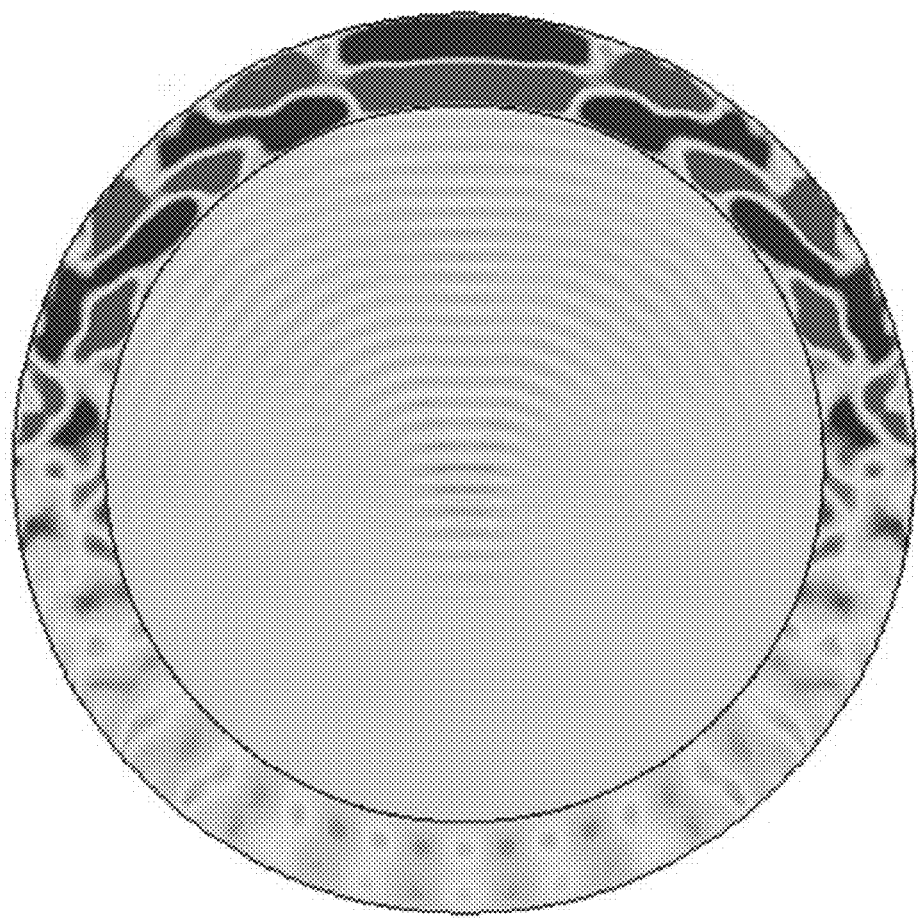
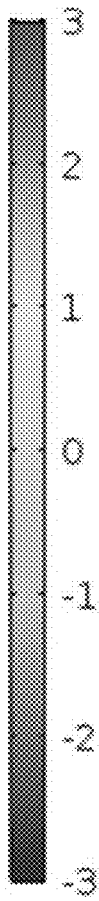

340

350

510

End caps and coupons

520

FIG. 6A
| Element Symbol | AVG Wt % | St Dev |
|---|---|---|
| Fe | 62.97 | 0.79 |
| Cr | 15.10 | 0.23 |
| O | 4.73 | 0.32 |
| Ni | 9.22 | 0.12 |
| Mn | 1.45 | 0.05 |
| Mo | 2.82 | 0.21 |
| Si | 0.63 | 0.05 |
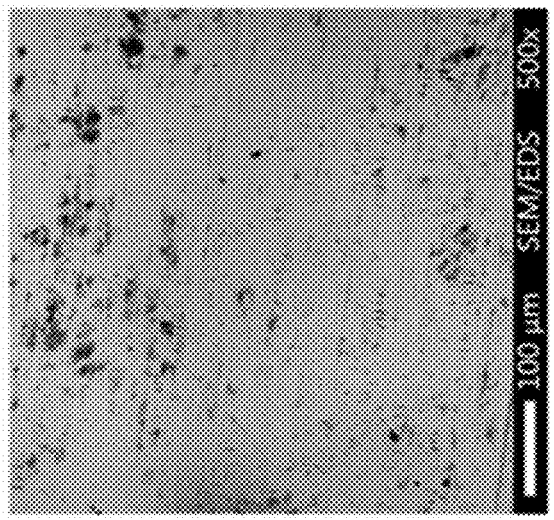
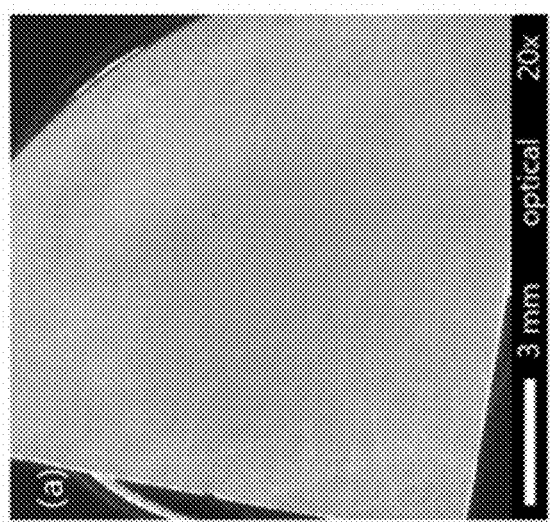
600

NON-INVASIVE, IN SITU DIAGNOSIS AND MONITORING OF CORROSION IN HIGH TEMPERATURE SYSTEMS

CROSS-REFERENCE TO RELATED APPLICATION

This application claims the benefit of U.S. Provisional Patent Application No. 62/819,872 filed Mar. 18, 2019. The subject matter of this earlier filed application is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to diagnosis and/or monitoring of corrosion, and more particularly, to non-invasive diagnosis and/or monitoring of physical properties of the container (e.g., wall loss, material deposit, material conversion, etc.) and/or contents (e.g., fluid viscosity, fluid density, etc.) in high temperature systems using narrowband sensors that produce multi-mode acoustic signals in situ for accurate determination of extended range, average local physical property changes due to corrosion in a vessel in contact with a high temperature, highly corrosive substance, such as a molten salt.

BACKGROUND

Diagnosis and monitoring of corrosion at high temperatures are common challenges in many industries, such as molten salt reactor (MSR) power plants. MSRs are increasingly gaining interest for the next generation of nuclear reactors. This type of reactor has many benefits, including scalability, increased safety, and higher efficiencies than other designs due to the higher operating temperatures (e.g., above 600° C.). There is renewed interest in MSRs in Japan, Russia, China, France, and the United States, where several U.S. companies are actively pursuing new MSR designs. These efforts are hindered by the need for stable and cost-effective materials that will survive in the harsh environments of elevated temperatures and radiation fields in contact with corrosive molten salts. There are currently no practical techniques for performing non-invasive, in situ corrosion testing and/or monitoring in these environments, which makes process evaluation and materials testing laborious and expensive. Also, conventional inspection techniques require cumbersome scanning of small area probes across extended areas.

Traditional non-destructive and non-invasive corrosion monitoring techniques include ultrasonic, radiographic, guided wave, and electromagnetic testing. A common ultrasonic thickness measurement involves sending (receiving) an ultrasound wave into (from) the sample using a probe on the surface to determine the thickness of the sample or defects at the location of the probe. Extended coverage is usually achieved by either manually or mechanically scanning the probe across the sample.

In radiographic testing, x-rays or gamma rays are utilized to inspect the internal structure and integrity of samples. Safety concerns and special requirements usually limit the general applicability of this technique. The guided wave technique employs acoustic waves that propagate along an elongated structure while guided by its boundaries, and thus can be used to monitor corrosion in extended ranges. However, existing guided wave technologies use multiple sensor arrays to excite particular modes of propagation using sophisticated electronics and require complicated analysis to extract wall loss information. As a result, they are difficult to implement at very high temperatures and/or in complex geometries. Electromagnetic testing is the process of inducing electric currents, magnetic fields, or both inside a test object and observing the electromagnetic response to extract corrosion information. Extended range corrosion monitoring with this technique is also limited due to the relatively large size of the probes and difficulties with implementations in complex geometries.

Long-range inspection tools for increased speed and reduced cost of maintenance may be beneficial. The current state-of-the-art for low-temperature, long-range inspection is gPIMS™ technique of Guided Ultrasonics®, Inc. In this technique, guided ultrasonic signals that are excited within the walls of pipes are sent out along the axis of pipes and reflections from defects are monitored. However, this technique has serious practical limitations because it cannot inspect beyond major nonuniform sections of pipelines, such as flange connections, junctions, and major bends.

Previous work by Los Alamos National Laboratory® and Chevron® successfully addressed the challenge of long-range monitoring of realistic pipelines with unavoidable structural nonuniformities at relatively low temperatures (i.e., less than 200° C.) by using multiple/hybrid-mode acoustic signals that are transmitted over nonuniform, as well as uniform, pipeline sections using a transmission (pitch and catch) technique. See, for example, U.S. Pat. No. 10,473,625, entitled "Detection and monitoring of changes in metallic structures using multimode acoustic signals". In an experiment of a prototype using this approach, commercial broadband sensors were used, and corrosion was identified and quantified in extended media (for example, pipes tens of feet long) by analyzing scattering events in the mixed frequency-time domain. Commercial, off-the-shelf lead zirconate titanate (PZT)-based piezoelectric sensors in compression mode were used for both transmit and receive functions below 200° C. However, this technique does not work as well at higher temperatures and over relatively short distances. Also, this technique does not measure physical properties of the fluid, such as density or viscosity, inside pipelines. Accordingly, an improved approach may be beneficial.

SUMMARY

Certain embodiments of the present invention may provide solutions to the problems and needs in the art that have not yet been fully identified, appreciated, or solved by conventional technologies for diagnosis and monitoring of corrosion. For example, some embodiments of the present invention pertain to diagnosis and/or monitoring of corrosion in high temperature systems using specialized sensors that produce multi-mode acoustic signals in situ for accurate determination of extended range, average local wall loss due to corrosion in a vessel (e.g., a pipe or other suitable structure in contact with a high temperature, highly corrosive substance, such as a molten salt. Such specialized sensors may be distinguished from common, general purpose, broadband, PZT-based sensors. Per the above, previously employed PZT-based sensors cannot be used at temperatures higher than approximately 200° C. Specialized sensors used in some embodiments may be able to operate in high temperature environments (e.g., 500° C. or more with suitable piezoelectric and electrode materials) and provide the ability to probe relatively short distances (e.g., a few inches) and relatively long distances (e.g., tens of feet) as desired, with a suitable design of the sensors to strongly couple to the desired acoustic modes. Certain embodiments may be able to excite modes to probe wall loss and/or fluid properties.

Use of the acoustic inspection technique of some embodiments for potential MSR research is expected to be in rapid screening and testing of molten salt-compatible materials in model flow systems, such as experimental cooling loops. Also, some embodiments could open new applications in acoustic inspection and monitoring of pipelines in conventional nuclear and fossil fuel power plants. Additionally, some embodiments could be applied to other extended mechanical structures that need in situ monitoring at elevated temperatures, such as in fusion, solar/thermal, geothermal, and other power plants (e.g., light water reactors or pressurized water reactors), boilers, combustion engines, heat engines (e.g., gas turbines), pyro-processing of nuclear fuel, and electro-refining of metals (for example, aluminum). Corrosion may be identified and/or monitored using analysis in the time domain alone in some embodiments. Some embodiments could also provide additional capabilities with proper choice of frequency, time-windowing, and acoustic coupling, such as in situ monitoring of the contents of the vessel (e.g., a pipe). Such monitoring could allow, for example, in situ, real time measurement of the density and viscosity of fluids in vessels (e.g., pipelines).

In an embodiment, a corrosion detection system includes a transmit sensor configured to produce and transmit a multi-mode acoustic signal, a receive sensor configured to receive the transmitted signal from the transmit sensor after the transmitted signal passes through walls of a vessel, contents of the vessel, or both, and control electronics. The control electronics are configured to control operation of the transmit sensor via an excitation signal, and to receive a signal detected by the receive sensor after the receive sensor receives the transmitted signal from the transmit sensor. The control electronics are also configured to perform time domain, frequency domain, or mixed time domain and frequency domain analysis of signal characteristics (e.g., signal amplitude variation with time and/or frequency), signal delay, or both, between the transmitted multi-mode acoustic signal and the signal received from the receive sensor to determine wall loss of the vessel, physical properties of the contents of the vessel, or both.

In another embodiment, a corrosion detection system includes a transmit sensor configured to produce and transmit a multi-mode acoustic signal, a receive sensor configured to receive the transmitted signal from the transmit sensor after the transmitted signal passes through walls of a vessel, contents of the vessel, or both, and control electronics. The control electronics are configured to control operation of the transmit sensor via an excitation signal and receive a signal detected by the receive sensor after the receive sensor receives the transmitted signal from the transmit sensor. The control electronics are also configured to perform time domain, frequency domain, or mixed time domain and frequency domain analysis of signal characteristics, signal delay, or both, between the transmitted multi-mode acoustic signal and the signal received from the receive sensor to determine wall loss of the vessel, physical properties of the contents of the vessel, or both. The transmit sensor, the receive sensor, or both, are broadband sensors having a ratio between low ($f_L$) and high ($f_H$) operational frequencies less than or equal to 10.

In yet another embodiment, a corrosion detection system includes a transmit sensor configured to produce and transmit a multi-mode acoustic signal and a receive sensor configured to receive the transmitted signal from the transmit sensor after the transmitted signal passes through walls of a vessel, contents of the vessel, or both. The corrosion detection system also includes at least one waveguide located between the transmit sensor and the vessel and at least one other waveguide located between the receive sensor and the vessel. The corrosion detection system further includes control electronics configured to receive a signal detected by the receive sensor after the receive sensor receives the transmitted signal from the transmit sensor. The control electronics are also configured to perform time domain, frequency domain, or mixed time domain and frequency domain analysis on the signal received from the receive sensor to determine signal characteristics, signal delay, or both, in the multi-mode transmitted signal for a predetermined portion of the received signal at specific values of time delay and time span, and then estimate wall loss in the vessel, physical properties of the contents of the vessel, or both, based on the determined signal. The at least one waveguide and the at least one other waveguide are configured to reduce a temperature to which the transmit sensor and the receive sensor are exposed, respectively.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1C illustrates a portion of a vessel with waveguides included between the transmit sensor, the receive sensor, and the vessel, according to an embodiment of the present invention.

FIG. 3A is a finite element (FE) numerical simulation illustrating acoustic wave excitation and propagation in 2-D for a gaussian pulse centered around 200 kHz on a 1-inch diameter vessel filled with molten salt, according to an embodiment of the present invention. At this frequency, predominantly guided wave modes within the vessel wall are excited.

FIG. 3D is a finite element (FE) numerical simulation illustrating acoustic wave excitation and propagation in 2-D for a gaussian pulse centered around 2 MHz on a 1-inch diameter vessel filled with molten salt, according to an embodiment of the present invention. At this frequency, fluid-mediated wave modes are also strongly excited, which can be used to monitor physical properties of the fluid inside the vessel.

FIG. 6A illustrates an initial microscopic image (left) and chemical analysis (right) of a stainless steel coupon surface before the experiment, according to an embodiment of the present invention.

DETAILED DESCRIPTION OF THE EMBODIMENTS

Figure 1A:
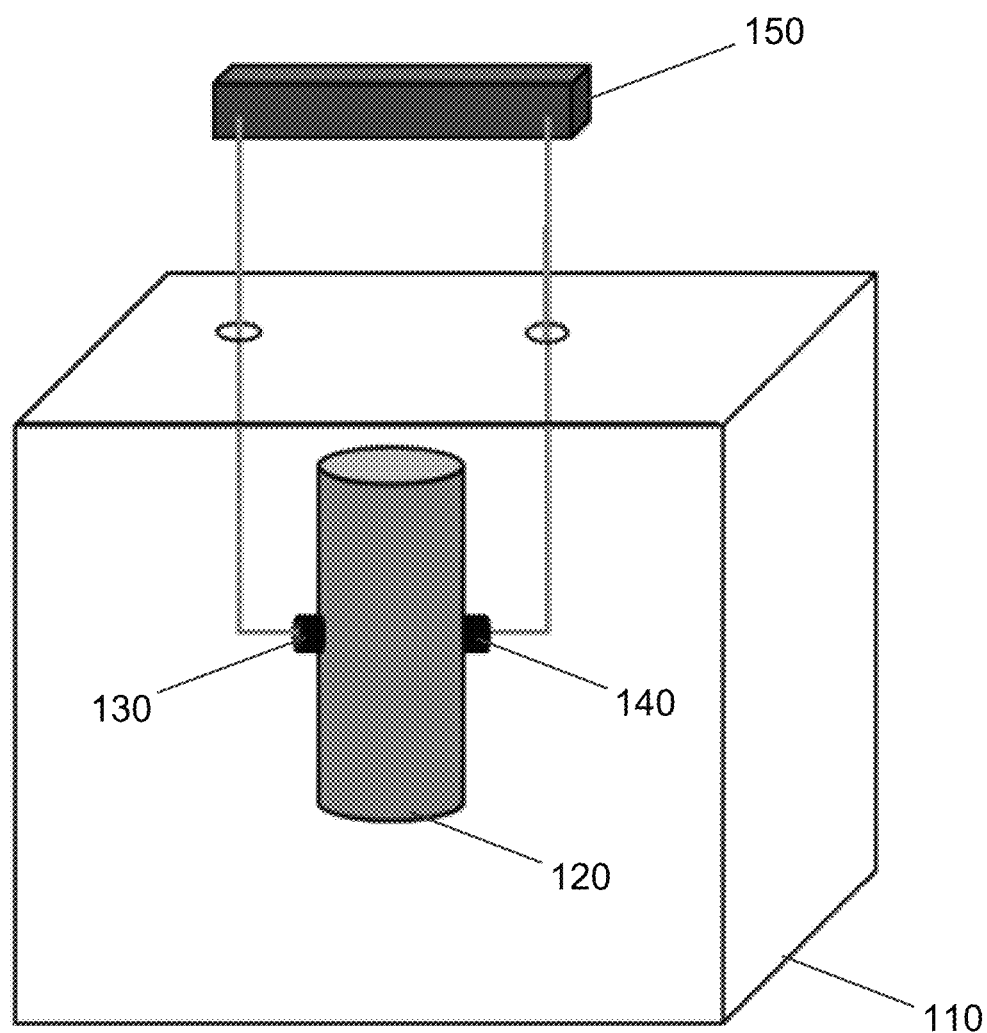
FIG. 1A is a perspective view illustrating a corrosion detection system, according to an embodiment of the present invention.

Some embodiments of the present invention pertain to diagnosis and/or monitoring of corrosion in high temperature systems using specialized sensors (e.g., single-element piezoelectric crystal sensors) that produce multi-mode acoustic signals in situ for accurate determination of extended range, average local wall loss in a vessel, changes to physical properties of the contents of the vessel, or both, due to corrosion from contact with a high temperature, highly corrosive substance, such as a molten salt. In some embodiments, "specialized" denotes a relatively broad frequency range between the low ($f_L$) and high ($f_H$) operational frequencies of the sensor (e.g., the ratio of the high frequency to the low frequency ($f_H/f_L$) is less than or equal to 10 in some embodiments). However, it should be noted that some embodiments may be used to monitor corrosion in any system, regardless of temperature and/or corrosiveness of a contained fluid.

As used herein, a "vessel" may be a pipe or a pipe assembly with any suitable number of flange(s), elbow(s), tee(s), reducer(s), and/or weld(s). A "vessel" may also be a pipeline, a storage tank, a storage container, or any other suitable structure that contains a high temperature substance without deviating from the scope of the invention. Sensitivity of a few microns (i.e., about 0.1%) of wall loss at temperatures of 500° C., 600° C., or more may be realized in some embodiments. Some embodiments identify and/or monitor corrosion using time domain, frequency domain, or mixed time domain and frequency domain analysis of signal delay and/or signal characteristics (e.g., analyzing changes in amplitude of the signal as a function of time and/or frequency) for relatively short circumferential acoustic wave propagation (e.g., a few inches).

Such techniques could also be used for rapid, non-destructive testing of new candidate reactor component materials, for example. General purpose, extended range acoustic monitoring and inspection devices and techniques technique for monitoring corrosion at high temperatures may be developed accordingly. Indeed, inspection and monitoring at temperatures of 900° C. or more may be realized, which is not currently possible.

This technique was demonstrated experimentally and shows promise for helping to ensure safe operation of high temperature, corrosion-prone systems, such as MSRs. However, some embodiments are not limited to MSRs, and may provide acoustic inspection and/or monitoring of pipelines in conventional nuclear and fossil fuel power plants. The technique of some embodiments could also potentially be applied to other extended mechanical structures that need in situ monitoring at elevated temperatures, such as in fusion, solar/thermal, geothermal, and other power plants (e.g., light water reactors or pressurized water reactors), boilers, combustion engines, heat engines (e.g., gas turbines), pyro-processing of nuclear fuel, and electrorefining of metals (e.g., aluminum), and/or for any other suitable application without deviating from the scope of the invention.

Experimental Setup and Results

In order to be effective at higher operating temperatures (e.g., 500° C. or more), suitable materials should be used for the sensors. These materials include, but are not limited to, piezoelectric materials, such as lithium niobate, gallium orthophosphate, langasite, etc. These sensors could be attached directly on the hot surface of the vessel of interest. Alternatively, a waveguide, such as a rod or a block, could be placed between the sensor and the vessel to reduce the temperature to which the sensors are exposed. For a prototype device used in experiments, lithium niobate single crystal sensors were selected. These sensors were coated with high temperature-compatible electrodes made from platinum (Pt). Use of mineral-insulated coaxial cables allowed connection from the elevated temperature of the sensors to electronics kept at room temperature during the experiments. High temperature-compatible nickel (Ni) alloy springs were used to attach sensors on model system vessels. The vessels were manufactured by machining pipe threads on both ends of 1-inch diameter, 5-inch long, schedule 40 pipe sections. The vessels were then sealed with threaded caps with inserted coupons serving as metal gasket seals.

The general architecture of a corrosion detection system 100 used in the experiment is shown in FIG. 1A. Corrosion detection system 100 includes a furnace 110 that is configured to heat its contents to a high temperature (e.g., 500° C. or more). Within furnace 110, a vessel 120 (e.g., a pipe) is filled with molten salt. A transmit sensor 130 and a receive sensor 140 are operably connected to or sufficiently proximate to vessel 120 to detect corrosion. Transmit sensor 130 and a receive sensor 140 are also operably connected to room temperature electronics 150 outside the furnace, which control the operation of transmit sensor 130 and receive signals from receive sensor 140. In this embodiment, transmit sensor 130 and receive sensor 140 are lithium niobate single crystal sensors. However, any sensor suitable for high temperature operation may be used as a matter of design choice.

Transmit sensor 130 (e.g., a transducer) transmits an acoustic signal that causes vessel 120 to vibrate. In some embodiments, such as that depicted in FIGS. 1A and 1B, transmit sensor 130 and receive sensor 140 are located on opposite sides from one another around vessel 120. The center frequency, frequency bandwidth, signal duration, and/or signal amplitude of acoustic signals generated by transmit sensor 130 are selected such that the desired multiple modes are excited and transmitted in the vessel and/or the fluid. The desired signal strength and duration are selected to provide an adequate signal-to-noise ratio (SNR) at the receive sensor for the guided wave modes of interest.

It should also be noted that chirp signals are a subset of the signals that may be generated in some embodiments. Commands for the signals are sent from control electronics 150 (e.g., a computing system, such as computing system 1100 of FIG. 11). An arbitrary waveform generator within a digitizing scope unit may generate the signal based on the received command, and send the signal to transmit sensor 130. The digitizing scope unit may be part of control electronics 150 or in communication therewith.

Receive sensor 140, which may be similar to transmit sensor 130 in terms of materials used and characteristics in some embodiments, then receives acoustic vibrations generated by transmit sensor 130 after they pass through vessel 120. The receive sensor could be made from lithium niobate, langasite, and/or any other suitable high temperature-compatible materials without deviating from the scope of the invention. Control electronics 150 select a time window (i.e., perform time-domain filtering) to record a certain section in time of the transmitted signal. Control electronics 150 also analyze the signal to determine wall loss and/or fluid-property changes. In some embodiments, wall loss due to corrosion is determined by a time-domain-only analysis of signal delay for short (i.e., a few inches) circumferential acoustic wave propagation between transmit sensor 130 and receive sensor 140. For example, by proper choice of signal duration and characteristics for the transmit sensor and proper choice of time delay and data acquisition duration for the receive sensor, the receive signal is dominated by guided waves, which allows direct calculation of signal delay as described above, from which wall loss is estimated.

Figure 1B:
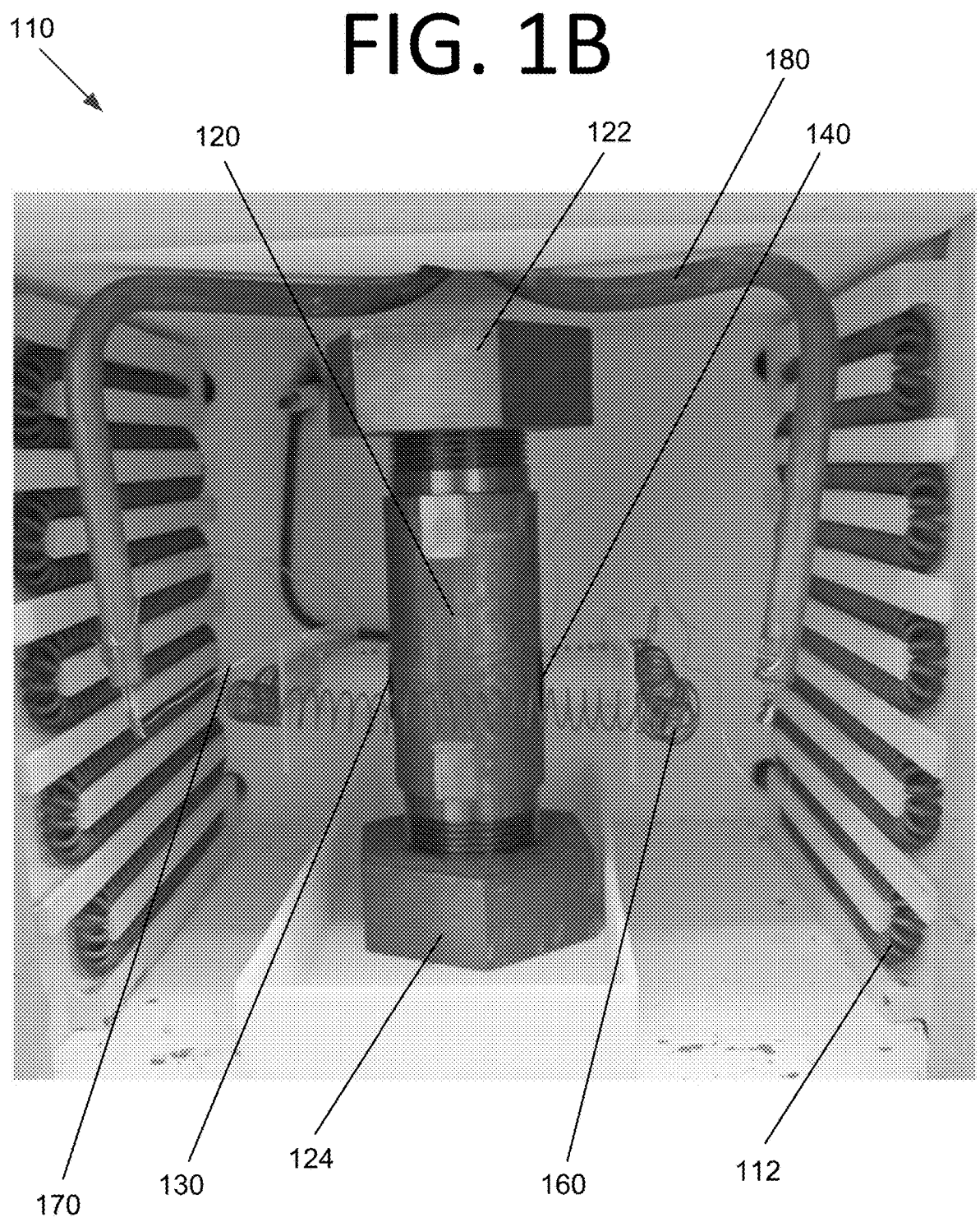
FIG. 1B illustrates the experimental setup of the corrosion detection system, according to an embodiment of the present invention.

FIG. 1B shows the interior of furnace 110 in the actual corrosion detection system 100 used for the experiments. Furnace 110 is heated by heating coils 112. Vessel 120 was filled with binary salt mixture and sealed on both ends with threaded caps 122, 124 containing metal coupon gaskets (see, e.g., FIGS. 5A-C). The two diametrically-opposed acoustic sensors 130, 140 are held in place with Ni-alloy springs 160. Ni-alloy wires 170 and cables 180 are used to transmit and receive signals to/from sensors 130, 140.

Rather than attaching transmit sensor 130 and receive sensor 140 directly to vessel 120, waveguides may be used. FIG. 1C illustrates a portion of vessel 120 with waveguides 132, 142 included between transmit sensor 130 and vessel 120 and between receive sensor 140 and vessel 120, respectively, according to an embodiment of the present invention. In some embodiments, more than one waveguide may be used per sensor. In this embodiment, waveguides 132, 142 are blocks. However, rods or other shapes may be used without deviating from the scope of the invention. Waveguides 132, 142 reduce the temperature to which sensors 130, 140 are exposed by conducting heat from vessel 120 away from sensors 130, 140. This may allow sensors 130, 140 to monitor higher temperature fluids and vessels than they would otherwise be capable of.

Figure 2:
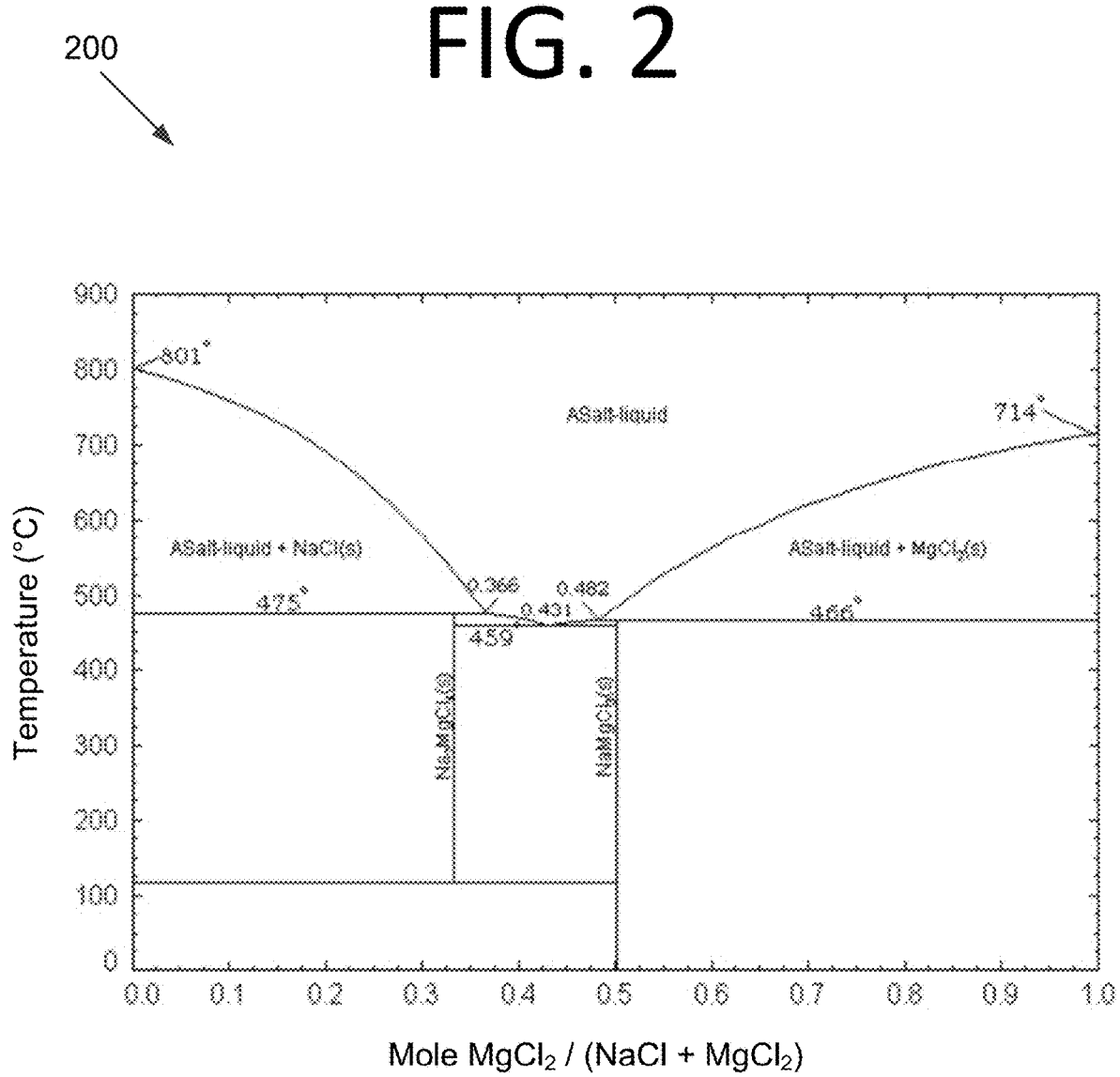
FIG. 2 illustrates a phase diagram for a binary salt mixture of $MgCl_2$ and $NaCl$.

A binary salt mixture of $MgCl_2$ and NaCl forms eutectic melt above 475° C. for a relatively wide range of compositions, and thus is a suitable model molten salt system to study detection of wall loss due to corrosion in a sealed container at and above 500° C. The phase diagram of binary salt mixture of MgCl2 and NaCl is shown in FIG. 2. Vessel 120 was filled with this binary salt mixture in this experiment.

316L (SS316) stainless steel and Hastelloy™ C276 were selected for vessel 120 and tested. However, it will be appreciated that any other suitable steel or other material may be used without deviating from the scope of the invention. The chemical composition of the 316L stainless steel is as follows (in weight percentage): C: 0.015, Mn: 0.660, P: 0.034, S: 0.002, Si: 0.340, Ni: 11.06, Cr: 16.75, and Mo: 2.05. The chemical composition of Hastelloy™ C276 is as follows (in weight percentage): C: 0.005, Mn: 0.400, P: 0.010, S: 0.002, Si: 0.020, Ni: 58.1, Cr: 15.9, Mo: 15.3, Co: 0.200, W: 3.20, V: 0.150, and Fe: 6.40.

For wall loss detection studies, vessel 120 made from stainless steel 316L or Hastelloy™ C276 with the salt mixture, with a mole ratio ($MgCl_2/(NaCl+MgCl_2)$) of approximately 0.43 in an inert gas (Ar) environment of a glovebox. Upon sealing of vessel 120, transmit acoustic sensor 130 and receive acoustic sensor 140 were attached with springs (not shown) diametrically opposing each other on the cylindrical wall of vessel 120. The temperature of the vessel with attached sensors 130, 140 was controlled by placing vessel 120 in a furnace 110 in air, as schematically depicted in system 100 of FIG. 1A and also shown in FIG. 1B.

Acoustic Measurement

The dispersion curves for acoustic wave propagation (also known as guided wave propagation) in cylindrical pipe walls are known. Among various available longitudinal, flexural, and torsional modes, the experimental technique preferentially excites flexural modes. Energy distribution among several excited modes is not controlled, nor does it need to be precisely known for the detection technique to determine wall loss, physical property changes in vessel contents, or both. As will be described in the following paragraphs, the wall loss is determined from phase shift (i.e., signal delay) incurred by a propagating multi-mode acoustic signal due to changing average wall thickness. Since the phase shift dependence on wall loss for a highly dispersive multi-mode signal is difficult to determine analytically, some embodiments rely on finite element (FE) analysis using a suitable program, such as COMSOL™. Once the fundamental aspects of the methodology are confirmed through comprehensive FE analysis, a phenomenological relationship can also be established on a reference system to deduce the phase shift dependence or signal characteristic dependence on wall loss or fluid property change.

For a single-mode acoustic signal, the small changes in phase delay are linearly proportional to small changes in wall thickness. For multi-mode acoustic signals, the relationship is generally more complicated. However, for acoustic modes with similar wave speed, numerical FE analysis can be used to show that small changes in effective phase delay of such multi-mode signals still have near-linear dependence on small changes in wall thickness.

For this experiment, acoustic gaussian pulses were used with a center frequency of 200 kHz and a full width at half maximum (FWHM) bandwidth of 20 kHz as the excitation signal from transmit sensor 130. This signal is then received by receive sensor 140 after passing through vessel 120 and the molten salt contained within. The signal received by receive sensor 140 is then analyzed by electronics 150. The technique of some embodiments provides average thickness change in the extended range that the signals travel in the walls of the vessel. In the case of determination of fluid property change, the average quantity measured is in the fluid medium traversed by the acoustic signals. In that case, the travel time within the fluid depends on the density of the fluid, and the energy loss of the signal traveling in the fluid depends on the viscosity of the fluid. Thus, by carefully measuring the travel time and attenuation of the fluid-mediated acoustic waves, the density and viscosity of the fluid inside a vessel can be determined using the following approximate relationships: (1) travel time is proportional to the square root of density; and (2) attenuation is proportional to viscosity. A more detailed analysis may involve applying analytical or numerical techniques to precisely determine the density and viscosity from measured signal characteristics in some embodiments.

Figure 3B:
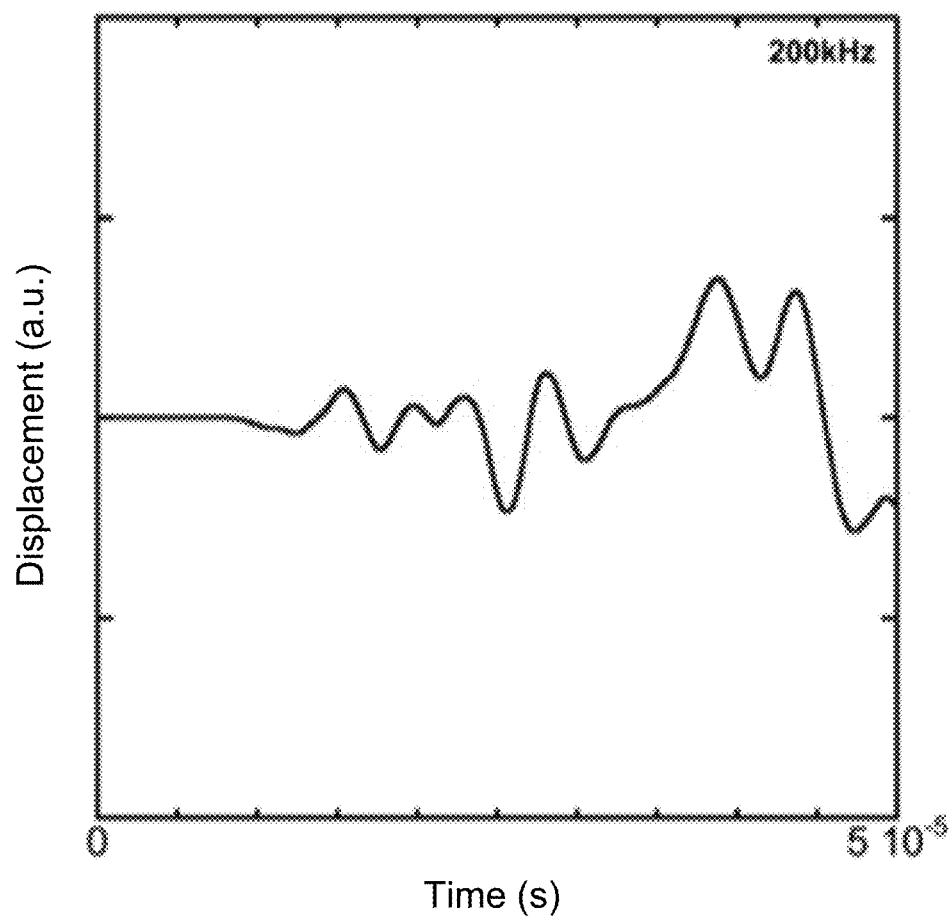
FIG. 3B is a graph illustrating displacement on a receive sensor, indicative of multi-mode propagation predominantly in the vessel wall for relatively short times (i.e., less than 50 µs), according to an embodiment of the present invention.
Figure 3C:
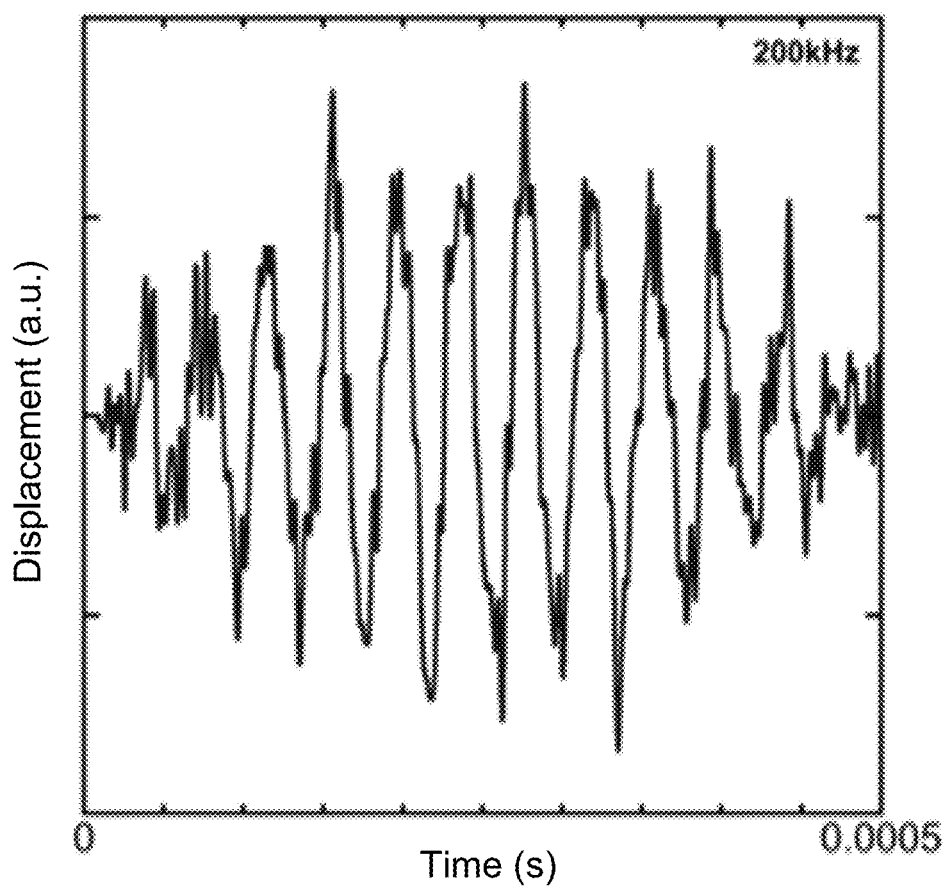
FIG. 3C is a graph illustrating displacement on the receive sensor for longer times (i.e., up to 0.5 ms), where fluid-mediated and fluid-coupled modes, as well as multiple circumferential propagation on the vessel wall, are observed, according to an embodiment of the present invention.
Figure 3E:
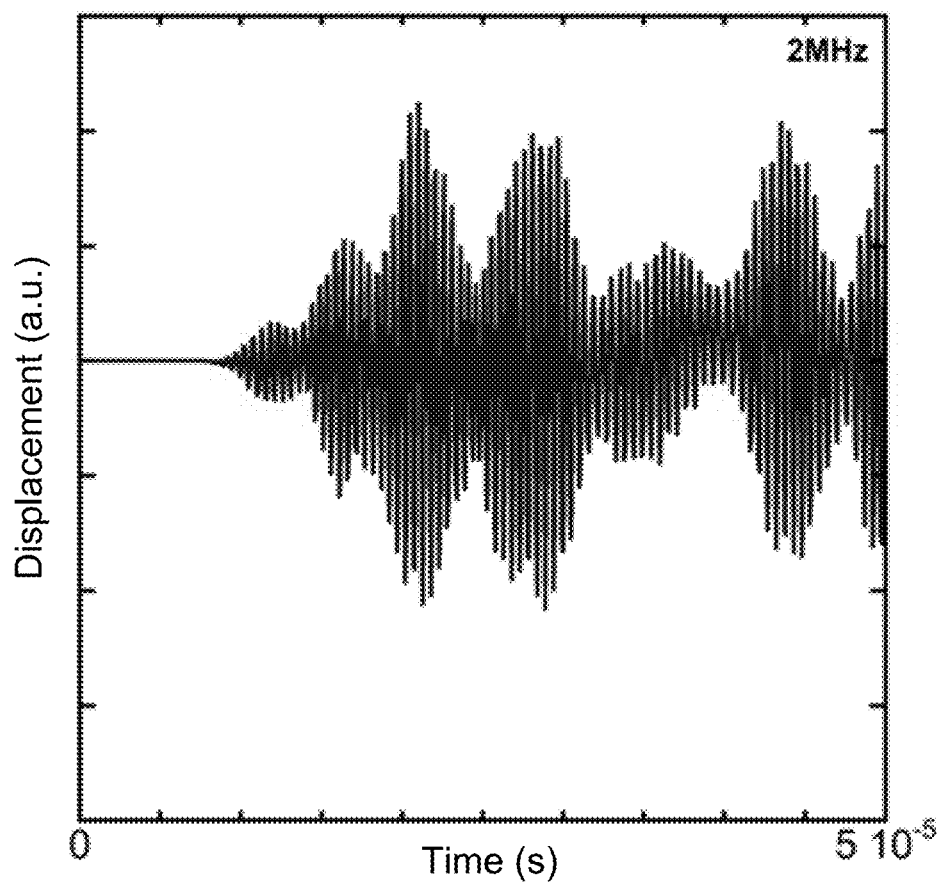
FIG. 3E is a graph illustrating displacement on a receive sensor, indicative of multi-mode propagation in the vessel wall as well as through the fluid for relatively short times (i.e., less than 50 µs), according to an embodiment of the present invention.
Figure 3F:
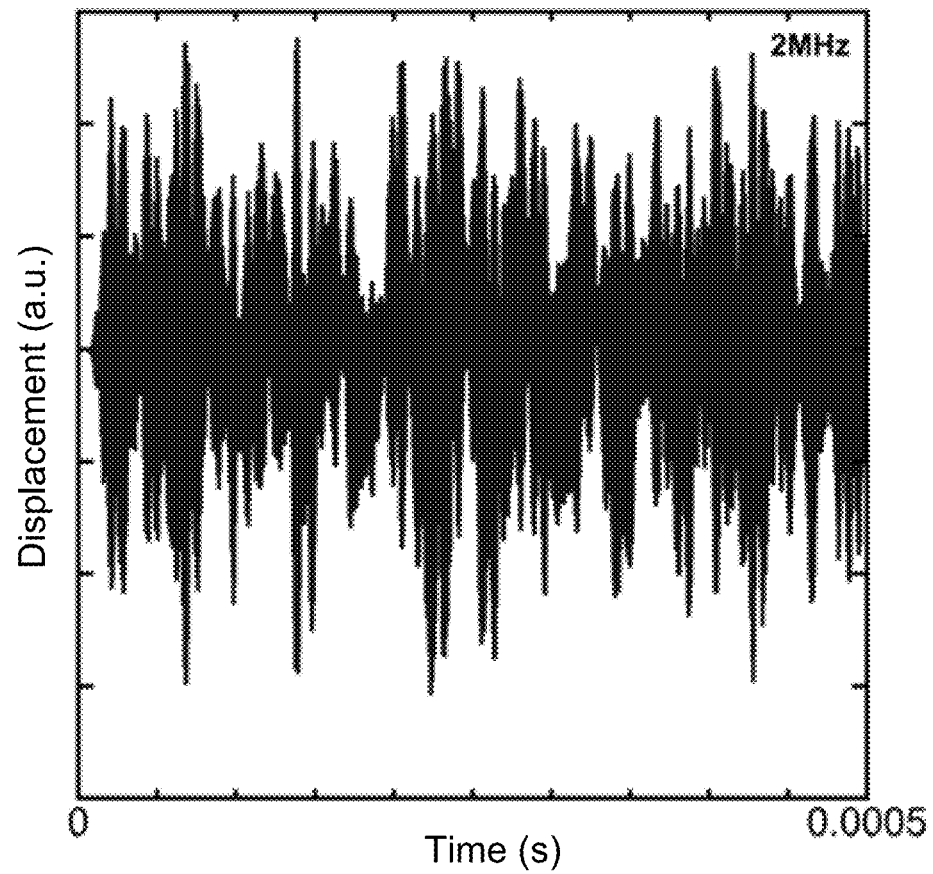
FIG. 3F is a graph illustrating displacement on the receive sensor for longer times (i.e., up to 0.5 ms), where fluid-mediated and fluid-coupled modes, as well as multiple circumferential propagation on the vessel wall, are observed, according to an embodiment of the present invention.

FE simulations of signal excitation and transmission are shown in graphs 300, 330 of FIGS. 3A and 3D, respectively. In FIG. 3A, the depicted COMSOL™ simulation shows the 2-D pressure distribution in the pipe wall and molten salt fluid at 50 µs after gaussian pulse signal excitation from transmit sensor 130 on the wall of vessel 120. In FIG. 3D, the depicted COMSOL™ simulation shows acoustic wave excitation and propagation in 2-D for a gaussian pulse centered around 2 MHz on a 1-inch diameter vessel filled with molten salt. At this frequency, fluid-mediated wave modes are also strongly excited, which can be used to monitor physical properties of the fluid inside the vessel. In graph 310 of FIG. 3B, displacement versus time is shown for signal arrival in a relatively short time scale at the location of diametrically opposing receive sensor 140 on the wall of vessel 120, where the displacement, sensed as a received signal, has a shape and duration indicative of rather complex multi-mode signal excitation and transmission. In graph 340 of FIG. 3E, displacement on a receive sensor versus time is shown, indicative of multi-mode propagation in the vessel wall as well as through the fluid for relatively short times (i.e., less than 50 µs). The "a.u." label for the y-axis stands for "arbitrary units." The signal in this relatively short time scale is dominated by guided acoustic wave transmission in the wall of vessel 120. Graph 320 of FIG. 3C captures a longer time scale for the received signal, where additional features are visible due to the signal traveling multiple times around the wall of vessel 120, as well as superposition of additional fluid-mediated and fluid-coupled signals. Graph 350 of FIG. 3F shows displacement versus time on the receive sensor for longer times (i.e., up to 0.5 ms), where fluid-mediated and fluid-coupled modes, as well as multiple circumferential propagation on the vessel wall, are observed. These features are observed both experimentally and in FE simulations.

Figure 4:
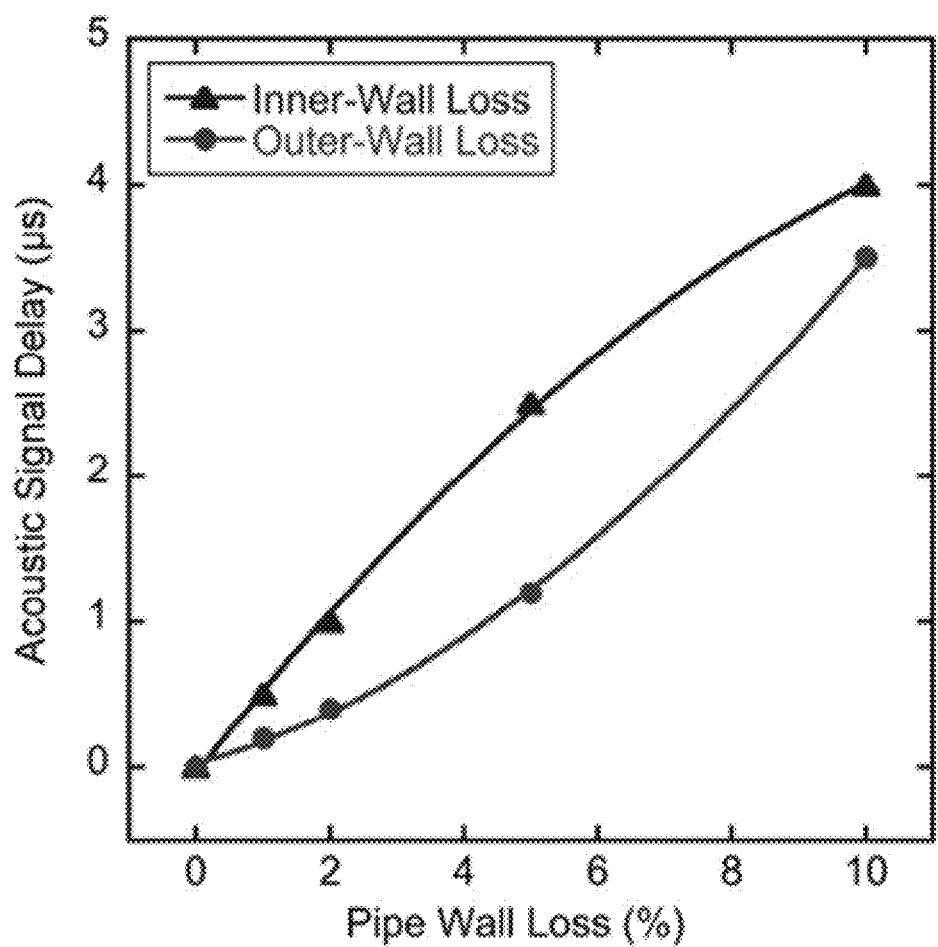
FIG. 4 is a graph illustrating simulated acoustic signal delay versus vessel wall loss (i.e., average wall loss) indicating a near-linear relationship, with a significant difference between outer-wall and inner-wall loss effects on signal delay, according to an embodiment of the present invention. In this embodiment, the simulated received signal portion between 0 and $5 \times 10^{-5}$ seconds, which corresponds to the experimental received signal portion shown in FIG. 3B, is used for delay calculation for the guided waves.

Numerical analysis of inner-wall and outer-wall loss on the propagating signal indicates that acoustic signal delay increases monotonically with wall loss in vessel 120, as shown in graph 400 of FIG. 4. There is significant difference between outer-wall and inner-wall loss effects on signal delay because outer-wall loss reduces the effective radius of vessel 120, whereas inner-wall loss increases the effective radius. This numerically calculated dependence can be used to estimate wall loss from measured signal delay.

Corrosion Experiments

Corrosion experiments were conducted by keeping the sealed containers (i.e., vessel 120), filled with binary molten salt mixtures at specific high temperatures (i.e., 500° C. or 600° C. in the experiments). These temperatures were maintained for certain durations (up to 60 hours) while making non-invasive, in situ acoustic signal measurements. Although some oxidation was observed on the outside of vessels 120 during these experiments, the wall loss was dominated by corrosive reaction of the inner walls of vessel 120 that were in contact with the molten salt in the liquid phase.

The acoustic wavelengths for various modes in the vessel walls due to 200 kHz excitation are of order 1 cm. Thus, the technique is expected to provide average wall thickness of vessels 120, and not have the spatial resolution to monitor surface roughness changes in the probed extended areas. Also, solid deposits on the corroded surfaces, such as well-adhered corrosion byproducts, are to a large extent indistinguishable from the original wall material. Thus, after corrosion experiments, the adhered salts were washed away with distilled water, which was assumed to be in the liquid phase during the acoustic measurements. However, any oxide deposits were left on the surface for following comparative wall thickness measurements on the inner coupons, which were assumed to be in solid phase during acoustic measurements. The details of thickness measurements on the coupons will be described in the next section.

Experiments and Discussion

Figure 5A:
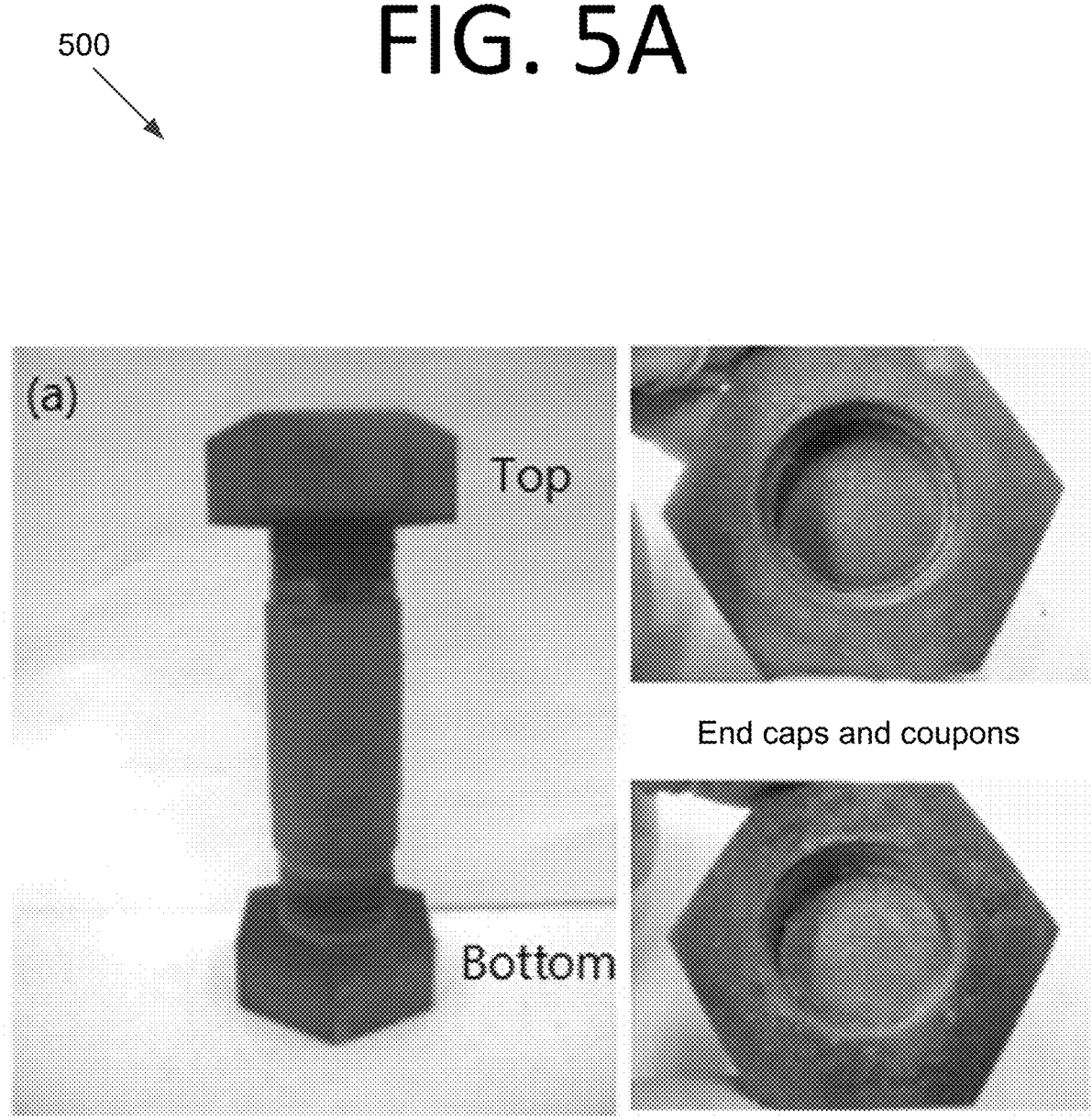
FIG. 5A illustrates a stainless steel (SS316) vessel, end caps, and coupons (located inside the end caps) kept at 500° C. for 20 hours and 600° C. for 20 hours of exposure to a molten $NaCl/MgCl_2$ eutectic, according to an embodiment of the present invention.
Figure 5B:
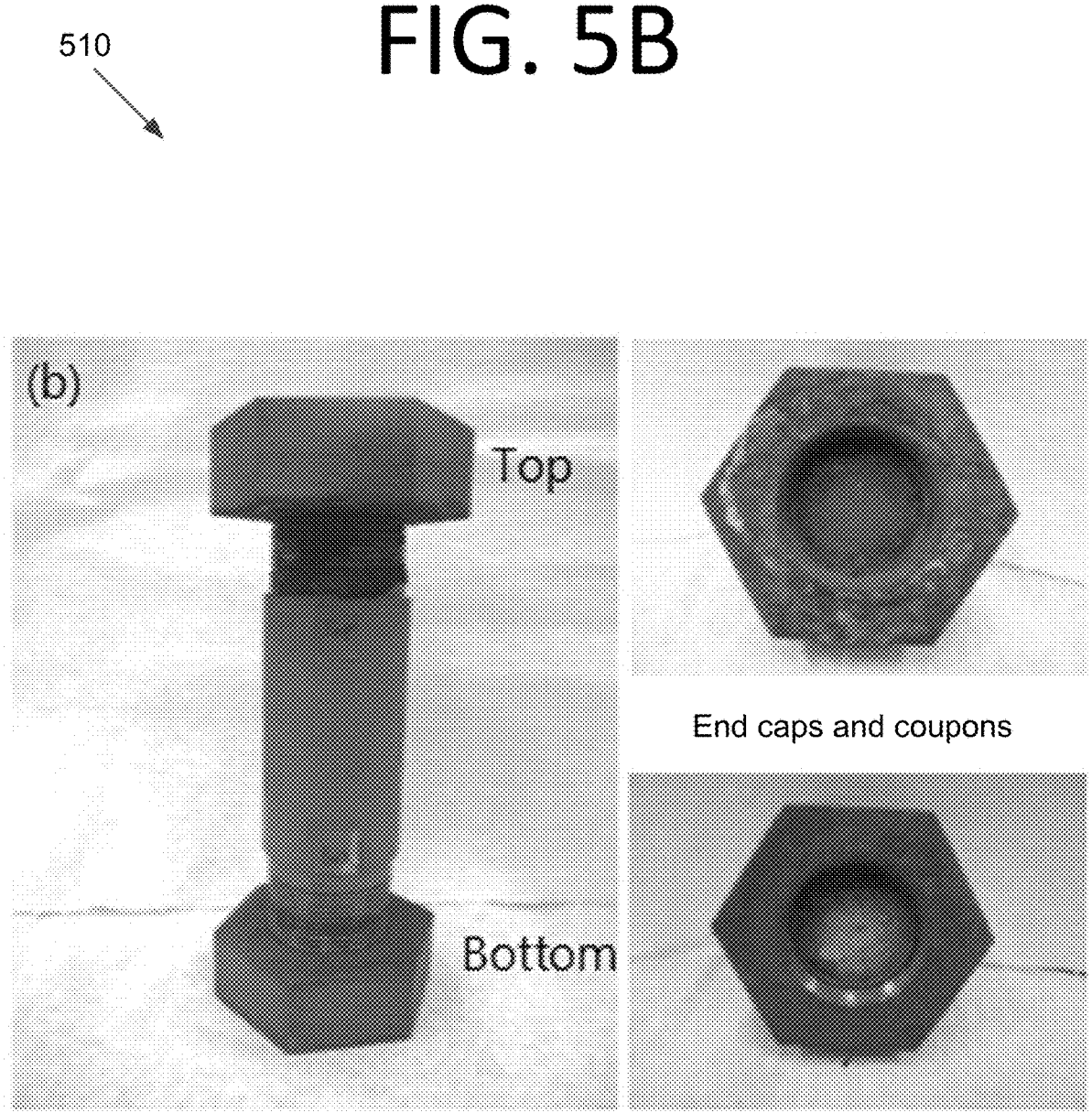
FIG. 5B illustrates a stainless steel (SS316) vessel, end caps, and coupons (located inside the end caps) kept at 600° C. for 60 hours of exposure to a molten $NaCl/MgCl_2$ eutectic, according to an embodiment of the present invention.
Figure 5C:
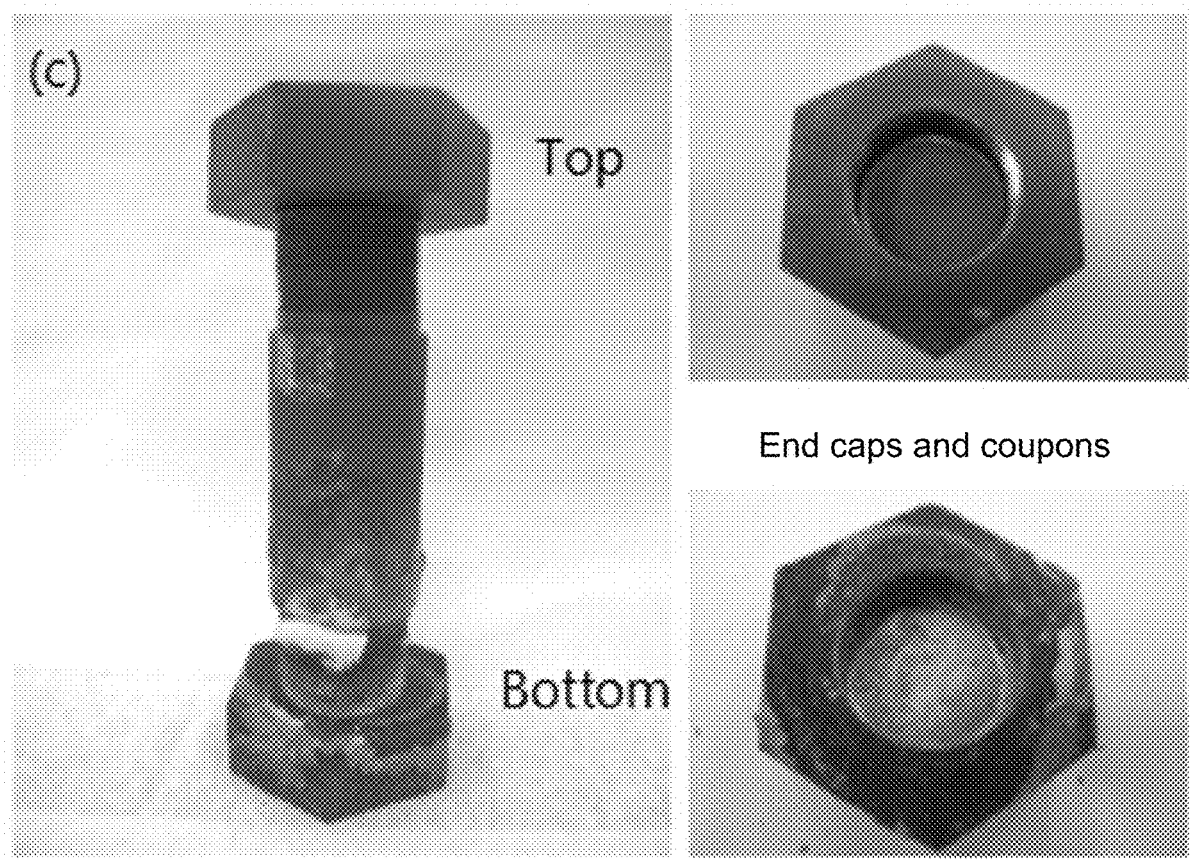
FIG. 5C illustrates a Ni-alloy (Hastelloy™ C276) vessel, end caps, and coupons (located inside the end caps) kept at 500° C. for 20 hours and 600° C. for 20 hours of exposure to a molten $NaCl/MgCl_2$ eutectic, according to an embodiment of the present invention.

In the experiments, vessels with end cap coupons were exposed to NaCl/MgCl$_2$ eutectic corrosion in the following experiments: (a) stainless steel (SS316) kept at 500° C. for 20 hours and 600° C. for 20 hours (b) stainless steel (SS316) kept at 600° C. for 60 hours; and (c) Ni-alloy (Hastelloy™ C276) kept at 500° C. for 20 hours and 600° C. for 20 hours. The vessels, end caps, and end cap coupons 500, 510, 520 for experiments (a), (b), and (c) are shown in FIGS. 5A, 5B, and 5C, respectively. Table 1 below summarizes corrosion rates, estimated from mass loss of coupons that were in contact with the molten salt liquid or gas, which also served as seals. The temperature and duration of time for each experiment is given in the first column of Table 1: 500° C. for 20 hours followed by 600° C. for 20 hours for experiment (a), 600° C. for 60 hours for experiment (b), and 500° C. for 20 hours followed by 600° C. for 20 hours for experiment (c).

TABLE 1

COUPON PHYSICAL MEASUREMENTS AND ESTIMATED MASS LOSS OF COUPONS (CONTACT CORROSION)

| Sample | Initial Coupon Mass (g), thickness (μm) | Top Coupon Mass (g) - Vapor Corrosion | Bottom Coupon Mass (g) - Contact Corrosion | Bottom Etch Thickness Estimate (μm) |
|---|---|---|---|---|
| SS316 500° C. (20 h), 600° C. (20 h) | 0.8075, 152.4 | 0.7988 | 0.7126 | 18 |
| SS316 600° C. (60 h) | 0.8075, 152.4 | 0.7836 | 0.6118 | 37 |
| Hastelloy C276 500° C. (20 h), 600° C. (20 h) | 1.7382, 304.8 | 1.7382 | 1.7370 | 1.4 |

As can be seen in Table 1, the Hastelloy™ C276 experienced almost no discernable vapor corrosion in the top coupon after the experiment.

During these high temperature experiments, the Ni-alloy vessel (FIG. 5C) developed a leak, which caused external salt deposit and corrosion outside of the vessel near the seal. However, the internal corrosion in the acoustic measurement zone and the bottom coupon was relatively low, as shown in Table 1 above. The extent of corrosion observed, based upon physical property changes of the metal coupons, suggests that Hastelloy™ C276 is significantly more corrosion resistant than SS316 under these molten salt and temperature conditions.

Figure 6B:
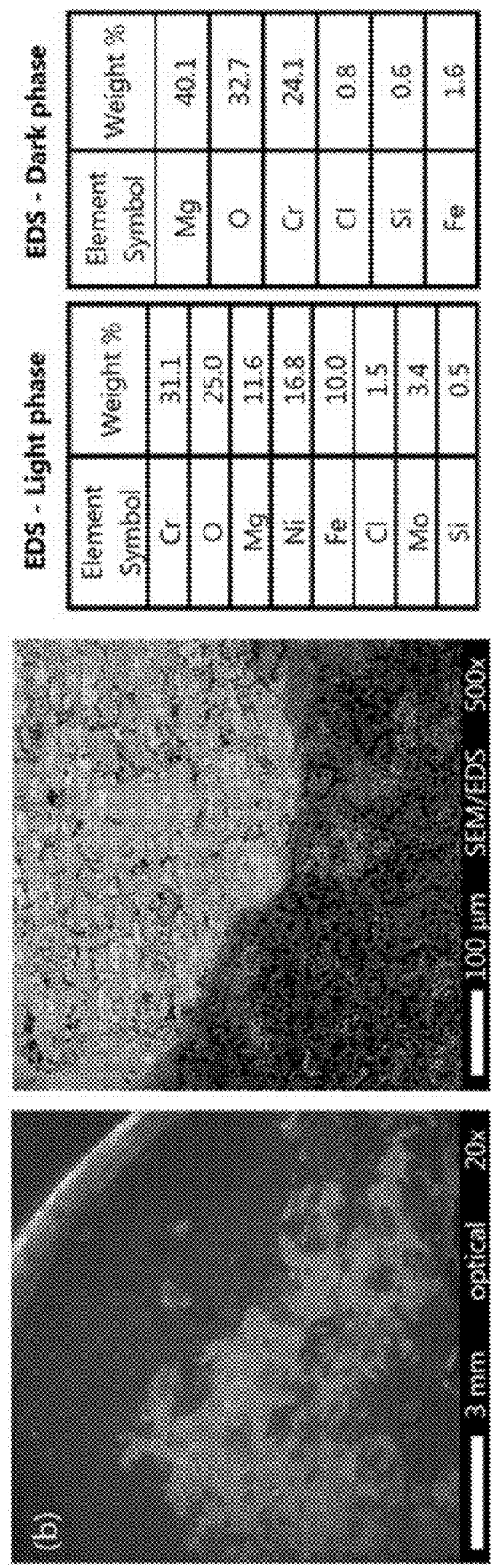
FIG. 6B illustrates a microscopic image (left) and chemical analysis (right) of the corroded stainless steel coupon surface after the experiment at 600° C. for 60 hours, where the coupon becomes Cr-rich, O-rich, and to a lesser extent, Ni-rich, according to an embodiment of the present invention.

Microscopic and chemical analyses of the specimens were done using a Phenom™ ProX benchtop scanning electron microscope (SEM) with energy dispersive x-ray spectroscopy (EDS). Analyses 600, 610 of FIGS. 6A and 6B summarize results on the specimens from experiment (b), where a molten salt-filled stainless steel (SS316) vessel was kept at 600° C. for 60 hours. In FIGS. 6A and 6B, the SEM/EDS of the coupons can be seen before and after they were exposed to the molten salt. With exposure to molten salt, the stainless steel surface gets rougher, a granular structure is revealed, and the initially Fe-rich surface becomes Cr-rich, O-rich, and to a lesser extent, Ni-rich. There is also significant amount of Mg detected at the corroded surface, which could come from either residual Mg from the chloride salt matrix or deposition of MgO.

Similar trends have been observed for all three experiments comparing the two different metal alloys. These observations confirm that the corrosion of SS316 and Hastelloy™ C276 in chloride-based molten salts proceeds via a complex mechanism and is likely not dominated by generalized corrosion. Of the three experiments depicted in FIGS. 5A-C, only the ones with stainless steel vessels (FIGS. 5A and 5B) had sufficient wall loss detectable by the acoustic technique used in the experiment.

Figure 7A:
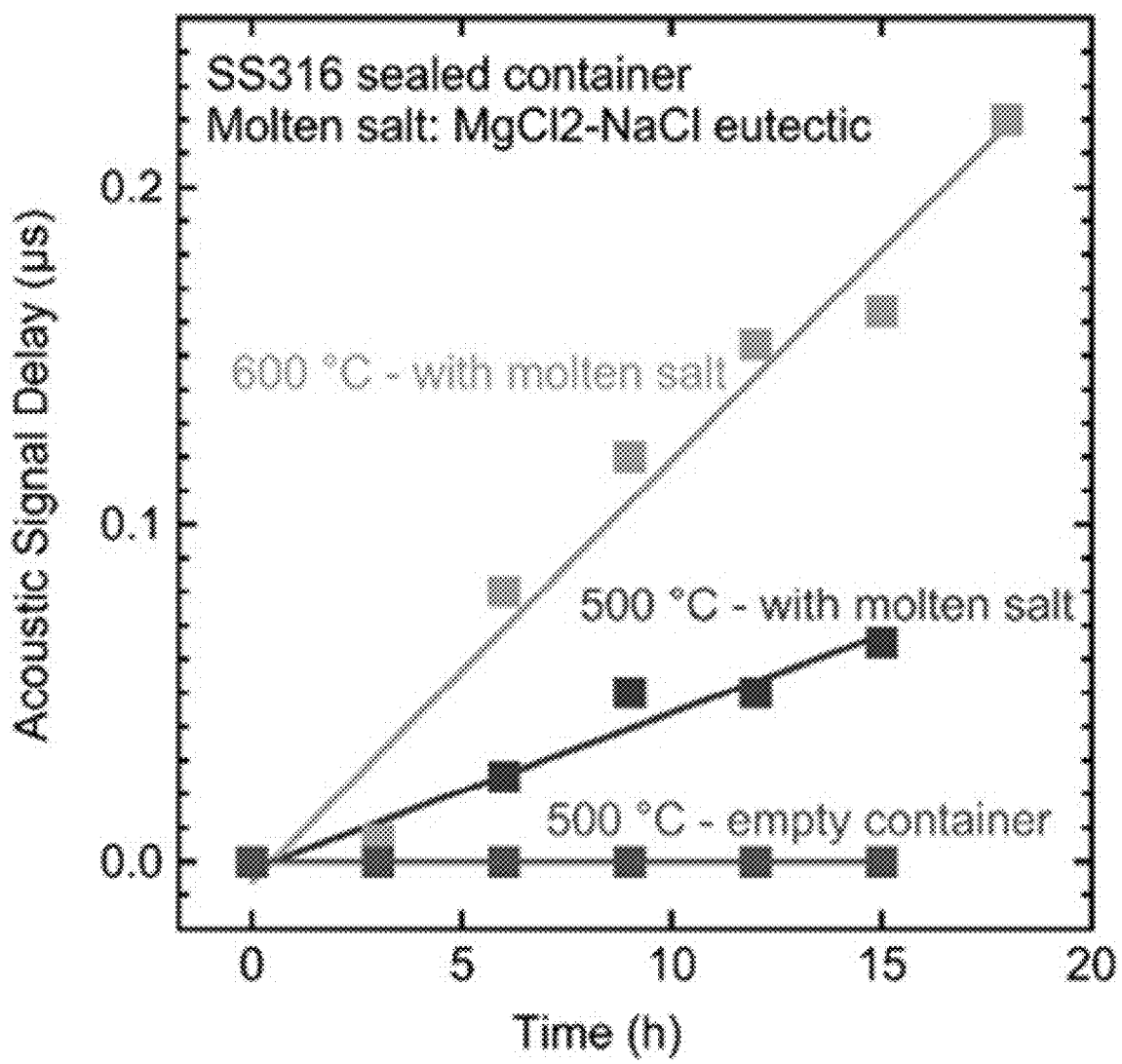
FIG. 7A is a graph illustrating the measured acoustic signal delay versus time at different temperatures and times for a first stainless steel (SS316) vessel, according to an embodiment of the present invention.
Figure 7B:
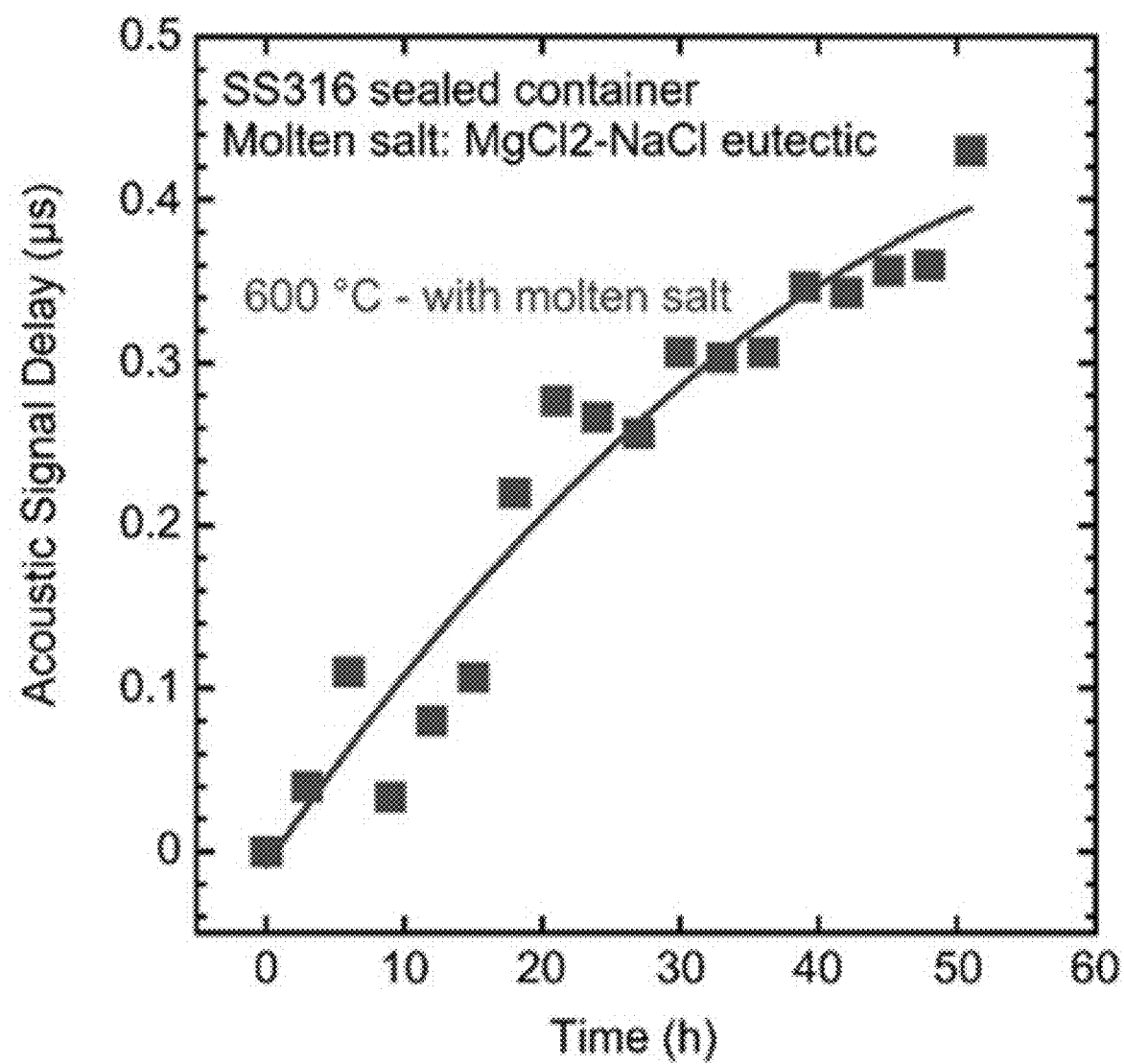
FIG. 7B is a graph illustrating the measured acoustic signal delay versus time at a 600° C. temperature for a first stainless steel (SS316) vessel, according to an embodiment of the present invention.

Graphs 700, 710 of FIGS. 7A and 7B show acoustic signal delays measured as a function of time for a first vessel (graph 700—empty first, then filled with molten salt while keeping the temperature at 500° C., and subsequently the temperature was raised and kept at 600° C.), and a second vessel (graph 710—filled with molten salt and the temperature was kept at 600° C.). In the first experiment, the empty container kept at 500° C. exhibited no measurable delay for 15 hours, indicating that the measurement scheme with spring-loaded sensor connections was stable and that the oxidation of vessel walls led to an insignificant amount of wall loss/change. However, in the case of filled containers, significant delays were observed, which increased approximately linearly with time (up to 15 hours). The measured delays also increased markedly with temperature (from 500° C. to 600° C.), as seen in FIG. 7A. In the second experiment (FIG. 7B), the filled vessel was kept at 600° C. for longer time (50 hours), in which case the observed time dependence of acoustic signal delay became slightly sub-linear.

Figure 8:
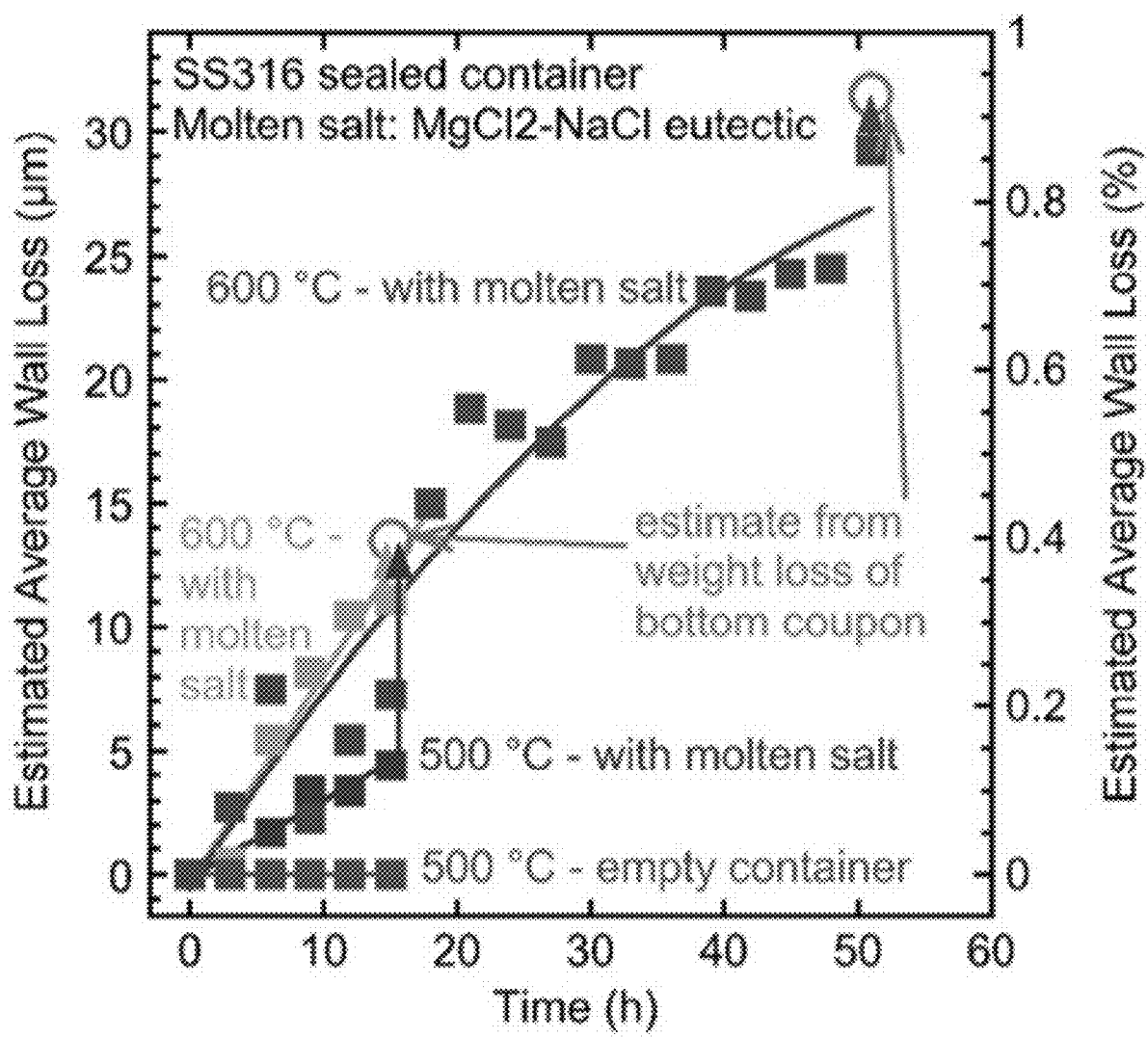
FIG. 8 is a graph illustrating estimated average wall loss versus time at 500° C. and 600° C. for two stainless steel (SS316) vessels. The squares represent data calculated from in situ acoustic measurements, whereas circles represent estimates from direct ex situ measurement of weight loss.

Using FE analysis results on the dependence of acoustic signal delay on wall thickness (seem FIG. 3A), one can convert measured signal delays to estimated average wall loss. Graph 800 of FIG. 8 combines estimated average wall loss, calculated in this manner from acoustic measurements, for the two experiments associated with graphs 700, 710. For comparison, FIG. 8 also includes separate estimates for wall loss, calculated directly from ex situ measurement of weight loss of bottom coupons (see the tables in FIG. 6B). See also Table 1 above, which summarizes coupon physical measurements and estimated mass loss of the coupons (contact corrosion). Both estimates, from acoustic measurements and weight loss, yield similar results. The stainless steel vessel filled with molten salt and kept at 600° C. loses about 14 μm (i.e., 0.4%) of total wall thickness in 15 hours, whereas a similar vessel kept at 600° C. for 50 hours loses approximately 30 μm (i.e., 0.9%) of total wall thickness. The measurements clearly indicate that the measurement sensitivity is significantly below the target minimum detection limit of 0.5% for the nuclear industry.

Figure 9:
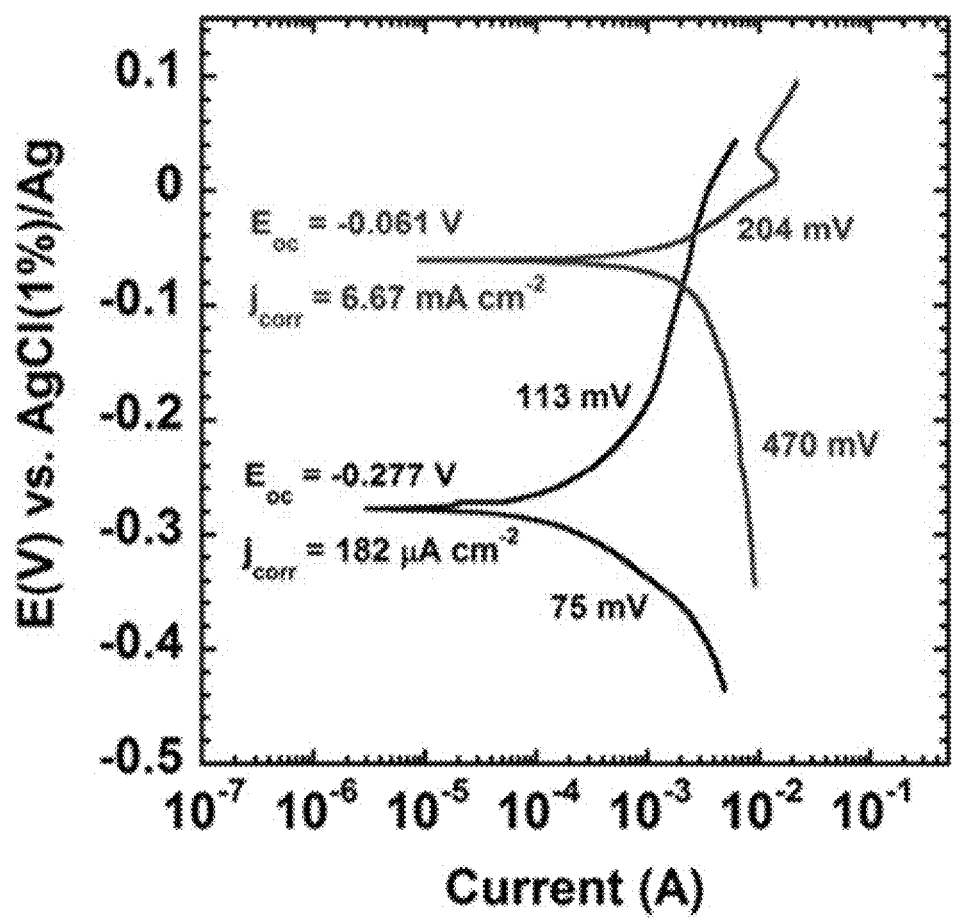
FIG. 9 is a graph illustrating polarization (Tafel) plots of stainless steel (SS316) wire at 600° C. after initial potential equilibration (black, bottom curve) and after ~1.5 hours (gray, top curve), according to an embodiment of the present invention.

In independent electrochemical corrosion measurements, after the open circuit potential ($E_{OC}$) of the stainless steel wire stabilized, the polarization curve was recorded at a scan rate of 0.16(6) mVs$^{-1}$ starting from the potentials more negative than $E_{OC}$. The corrosion current was determined from Tafel analysis within the potential between +0.07 V and −0.06 V vs. $E_{OC}$. Graph 900 of FIG. 9 shows two polarization (Tafel) curves of stainless steel (SS316) wire at 600° C. after initial potential equilibration (black) and after ~1.5 hours (gray) obtained for the same working electrode after the first potential equilibration and after ~1.5 hours after the first polarization curve was recorded. The corrosion current densities ($J_{corr}$), open circuit potentials ($E_{oc}$), and the Tafel slopes of the respective cathodic and anodic branches of the curves are shown in FIG. 9. The scan rate was approximately 0.17 mV s$^{-1}$.

Graph 900 demonstrates a significant increase in the corrosion rate after the first polarization curve was recorded. Subsequent polarization curve measurements during a 24-hour period demonstrated the irreversible character of the observed corrosion rate increase. The initial rate of SS316 corrosion (black curve) was calculated to be 4.1 mm/year using 55.38 g for the equivalent weight of SS316 and 8.0 g cm$^{-3}$ for its density. As the weight loss of the wire pieces on the cell bottom measured over the 24-hour period corresponded to only a ~1 mm/year corrosion rate (see Table 1), i.e., considerably less than that measured electrochemically, it was concluded that the corrosion rate increase in FIG. 9 was predominantly caused by compositional changes of the stainless steel surface associated with its accelerated oxidation at the potentials more positive than $E_{OC}$. At the same time, the lower corrosion rate of the wire pieces than the initial corrosion rate obtained from the polarization curves in FIG. 9 most likely resulted from the limited access of the electrolyte to the partially stacked wire pieces in the measurement cell.

Conclusions from Experiments

These experiments demonstrated an acoustic monitoring technique at high temperatures (up to 600° C.). This may be suitable for monitoring of corrosion and embrittlement in conventional and future power plants, such as MSR systems. This technique could provide a mechanism to rapidly screen and test new coatings and alloys in contact with different molten salt materials, as well as allow detailed study of the degradation effects and mechanisms. Another potential application of this technique could be in non-invasive, in situ inspection and monitoring of MSR systems or other high temperature systems subject to corrosion.

The acoustic measurements in these experiments at 500° C. and 600° C. yielded a minimum detection (sensitivity) limit of a few microns (i.e., ~0.1%) of wall loss, which is comparable to what had previously been measured as part of other work performed near room temperature. However, there were significant differences between the previous work and the tested embodiments beyond the temperature of operation. For instance, the previous work used commercial broadband sensors and identified and quantified corrosion in extended media (tens of feet in length) by analyzing scattering events in the mixed frequency-time domain for axial wave propagation. The tested embodiments, on the other hand, used specialized sensors based on custom single crystals, and identified corrosion through time-domain-only analysis of signal delay for short (i.e., a few inches) circumferential acoustic wave propagation.

Ultrasonic thickness gauging is the most commonly used non-destructive testing technique for wall thickness measurement. Recently developed inspection techniques that use permanent installation of sensors offer substantial benefits over conventional inspection techniques that use handheld sensors and are performed at predetermined time intervals. However, development of permanent sensors that can withstand high temperatures, and their reliable coupling and attachment, are significant challenges for their implementation. All elevated-temperature (i.e., greater than 500° C.) demonstrations of permanent sensors so far have been for point detection of wall thickness at the location of sensors or coupled waveguides. The tested embodiments, on the other hand, allowed extended range wall thickness monitoring at elevated temperatures (greater than 500° C.) by combining spring-loaded dry contacts for high temperature-compatible sensors with multi-mode ultrasonic wave excitation, propagation, and analysis.

The experiments that were conducted demonstrated extended range (i.e., beyond the immediate vicinity under the transmit sensor), by probing the circumference of the pipe between the transmit and receive sensors. In other words, unlike point detection techniques, where the wall thickness is determined directly under the acoustic sensor, in these experiments, average wall loss was determined in the extended range between the transmit and receive sensors. However, there is no fundamental limitation for how far the inspection zone can be extended in some embodiments. For instance, circumferential propagation and wave propagation along the pipe axis may be employed. Propagation along the axis of pipelines may allow investigation of much larger extended range and of structures with much larger structural or geometric complexity. However, it should be noted that in certain cases, there could be practical limitations due to the complexity of the pipe structure and geometry and simulation of wave propagation in such a complex structure or geometry.

The high temperature tests were limited to 600° C. or below for these experiments. However, extending the operational range to 900° C. or higher with the same methodology is relatively straightforward in principle by using appropriately-rated high-temperature sensor materials, optional waveguides, and coaxial cables. In practice, additional technical issues may need to be addressed for operation at higher temperatures.

Initial use of the acoustic inspection technique of some embodiments for potential MSR research is expected to be in rapid screening and testing of molten salt-compatible materials in model flow systems, such as experimental cooling loops. This should require installation of several sensors on relevant sections of the loop and coupling of these sensors to an electronics system for testing and analysis. Basic tests of the radiation stability of the sensors should also be conducted by exposing the sensors to relevant radiation in a controlled environment, such as in a glovebox. Although the experiments that were conducted were successful in estimating average wall loss, detailed study of corrosion and embrittlement effects, including correlation between properties of transmitted acoustic signals and microscopic features of corrosion, may require further empirical, theoretical, and modeling studies.

The acoustic technique of some embodiments could open new applications in acoustic inspection and monitoring of pipelines in conventional nuclear and fossil fuel power plants. The technique could also potentially be applied to other extended mechanical structures that need in situ monitoring at elevated temperatures, such as in fusion, solar/thermal, geothermal, and other power plants (e.g., light water reactors or pressurized water reactors), boilers, combustion engines, heat engines (e.g., gas turbines), pyroprocessing of nuclear fuel, and/or electro-refining of metals (e.g., aluminum), for example.

Figure 10:
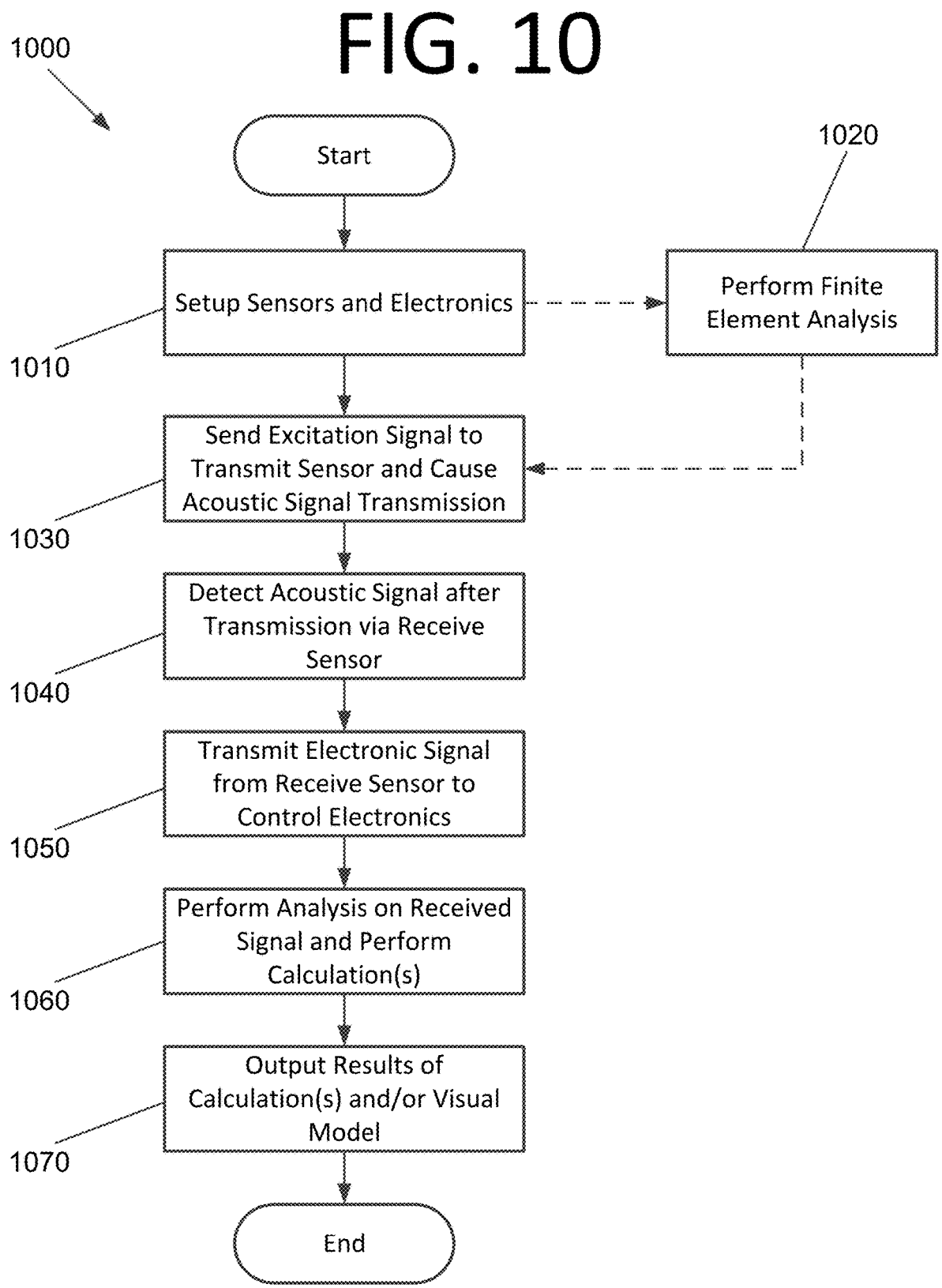
FIG. 10 is a flowchart illustrating a process for measuring corrosion in a vessel causing wall loss on vessel walls, physical property changes in vessel contents, or both, according to an embodiment of the present invention.

FIG. 10 is a flowchart illustrating a process 1000 for measuring corrosion in a vessel causing wall loss on vessel walls, physical property changes in vessel contents, or both, according to an embodiment of the present invention. The process begins with setting up a transmit sensor, a receive sensor, and control electronics for a desired vessel or portion of a vessel at 1010. In some embodiments, since the phase shift dependence on wall loss for a highly dispersive multi-mode signal is difficult to determine analytically, FE analysis is performed at 1020. Once the fundamental aspects of the methodology are confirmed through comprehensive FE analysis, a phenomenological relationship can also be established on a reference system to deduce the phase shift dependence on wall loss or fluid property change. The control electronics (e.g., via an arbitrary waveform generator of a digitizing scope unit) then send an electric excitation signal to the transmit sensor, which, responsive thereto, emits an acoustic signal at 1030. In some embodiments, the control electronics and the transmit functionality are integrated into a single transmit sensor, which may have electronics similar to computing system 1100 of FIG. 11, for instance.

The signal emitted by the transmit sensor passes through the vessel, and is received and detected by the receive sensor at 1040 after a certain amount of time. The receive sensor transmits the detected signal to the control electronics at 1050 for processing in the time domain, frequency domain, or mixed time domain and frequency domain. The control electronics analyze the change in the received signal and calculate corrosion due to wall loss, physical property changes in vessel contents (e.g., changes in density, viscosity, electromechanical coefficients, piezoelectric coefficients, elastic constants, dielectric constants, etc.), or both, at 1060 by calculating a phase delay in a specific time window, changes in the characteristics of the received signal, or both. The estimated wall loss and/or changes in the physical properties of the contents of the vessel, a 2-D and/or 3-D visual model of the vessel and/or its contents, or both, are then output at 1070. A 2-D model could show reduced wall thickness, physical property changes in the contents of the vessel, or both, as a cross section, whereas a 3-D model could show reduced wall thickness, physical property changes in the contents of the vessel, or both, in different zones (e.g., along an axis running through the pipe's center and parallel thereto.

Figure 11:
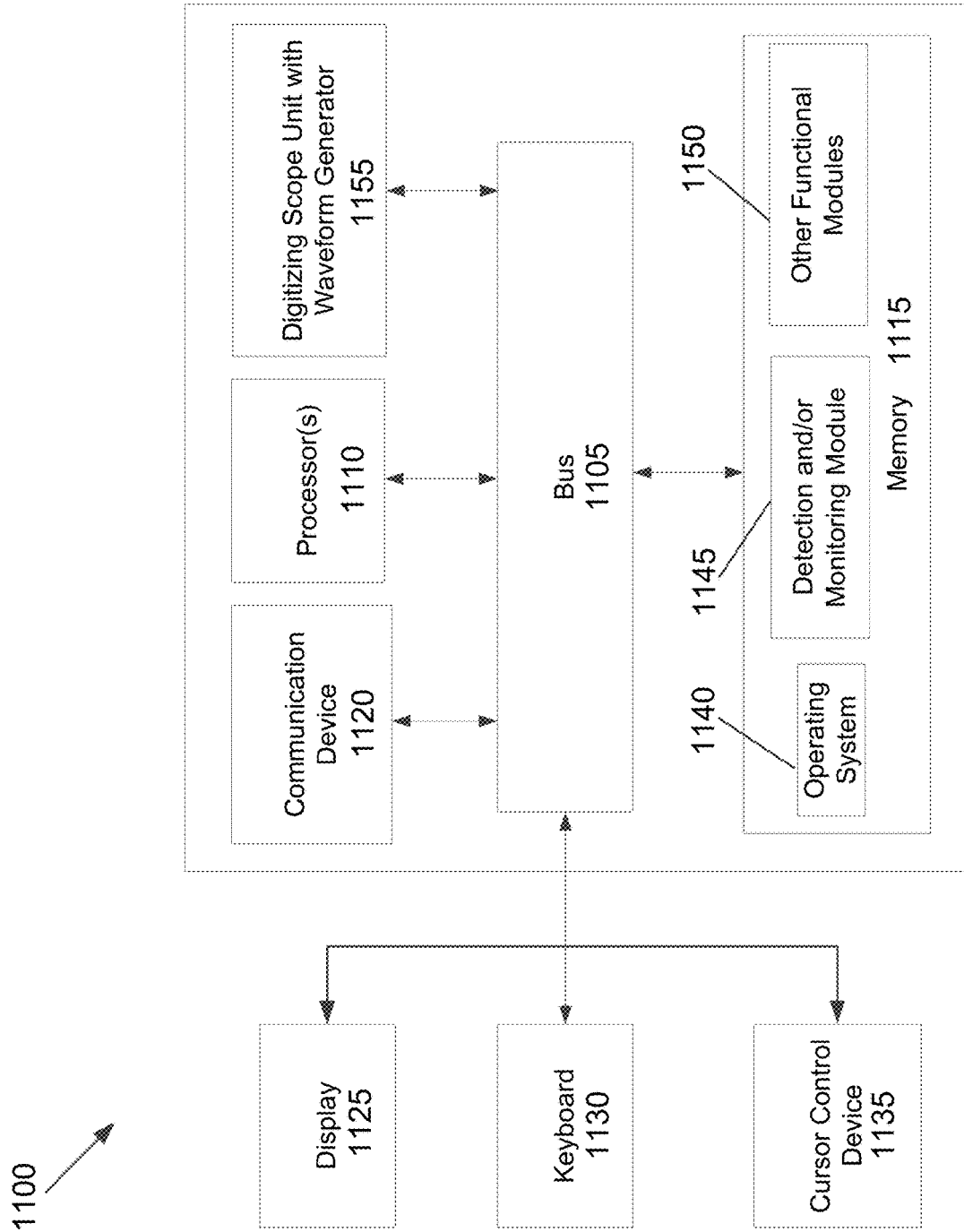
FIG. 11 is a block diagram illustrating a computing system configured to detect and/or monitor corrosion in a high temperature system, according to an embodiment of the present invention.

FIG. 11 is a block diagram illustrating a computing system 1100 configured to detect and/or monitor corrosion in a high temperature system, according to an embodiment of the present invention. In some embodiments, computing system 1100 may be electronics 150 of FIGS. 1A and 1B, for example. Computing system 1100 includes a bus 1105 or other communication mechanism for communicating information, and processor(s) 1110 coupled to bus 1105 for processing information. Processor(s) 1110 may be any type of general or specific purpose processor, including a central processing unit (CPU), application specific integrated circuit (ASIC), field programmable gate array (FPGA), etc. Processor(s) 1110 may also have multiple processing cores, and at least some of the cores may be configured to perform specific functions. Multi-parallel processing may be used in some embodiments. Computing system 1100 further includes a memory 1115 for storing information and instructions to be executed by processor(s) 1110. Memory 1115 can be comprised of any combination of random access memory (RAM), read only memory (ROM), flash memory, cache, static storage such as a magnetic or optical disk, or any other types of non-transitory computer-readable media or combinations thereof. Additionally, computing system 1100 includes a communication device 1120, such as a transceiver and antenna, to wirelessly provide access to a communications network.

Non-transitory computer-readable media may be any available media that can be accessed by processor(s) 1110 and may include volatile media, non-volatile media, or both. The media may also be removable, non-removable, or both.

Processor(s) 1110 are further coupled via bus 1105 to a display 1125, such as a Liquid Crystal Display (LCD), for displaying information to a user. A keyboard 1130 and a cursor control device 1135, such as a computer mouse, are further coupled to bus 1105 to enable a user to interface with computing system. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include a detection and/or monitoring module 1145 that is configured to perform corrosion detection and/or monitoring, monitor changes in properties of the contents of a vessel, or both, by employing any of the approaches discussed herein or derivatives thereof. Computing system 1100 may include one or more additional functional modules 1150 that include additional functionality.

A digitizing scope unit with an arbitrary waveform generator 1155 may generate a signal based on a received command signal, and then send the generated signal to a transmit sensor. In some embodiments, the digitizing scope unit is separate from a body of computing system 1100, but receives communications therefrom, similar to display 1125, keyboard 1130, and cursor control device 1135. In such embodiments, the digitizing scope unit is also capable of sending signals to the transmit sensor.

One skilled in the art will appreciate that a "system" could be embodied as a server, an embedded computing system, a personal computer, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 10 may be performed by a computer program, encoding instructions for the processor(s) to perform at least the process described in FIG. 10, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the processor(s) to implement the process described in FIG. 10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A corrosion detection system comprising:
   a transmit sensor configured to produce and transmit a multi-mode acoustic signal;
   a receive sensor configured to receive the transmitted signal from the transmit sensor after the transmitted signal passes through walls of a vessel, contents of the vessel, or both; and
   control electronics configured to:
   control operation of the transmit sensor via an excitation signal,
   receive a signal detected by the receive sensor after the receive sensor receives the transmitted signal from the transmit sensor, and
   perform time domain, frequency domain, or mixed time domain and frequency domain analysis of signal characteristics, signal delay, or both, between the transmitted multi-mode acoustic signal and the signal received from the receive sensor to determine wall loss of the vessel, physical properties of the contents of the vessel, or both.

2. The corrosion detection system of claim 1, wherein the excitation signal comprises acoustic gaussian pulses with a center frequency of 200 kHz and a full width at half maximum (FWHM) bandwidth of 20 kHz.

3. The corrosion detection system of claim 1, wherein a center frequency, a frequency bandwidth, a signal duration, and/or a signal amplitude of the multi-mode acoustic signal generated by the transmit sensor excite and transmit the multiple acoustic modes in the vessel, the contents of the vessel, or both.

4. The corrosion detection system of claim 1, wherein the time domain, frequency domain, or mixed time domain and frequency domain analysis comprises using dispersion curves for acoustic wave propagation in one or more walls of the vessel.

5. The corrosion detection system of claim 1, wherein the transmit sensor, the receive sensor, or both, are broadband sensors having a ratio between low ($f_L$) and high ($f_H$) operational frequencies of less than or equal to 10.

6. The corrosion detection system of claim 1, wherein the corrosion detection system has sufficient sensitivity to detect vessel wall loss of 0.1%, a 1% change in density or viscosity of the contents of the vessel, or both, at temperatures of 500° C. or more.

7. The corrosion detection system of claim 1, wherein the vessel contents comprise a substance at a temperature of 500° C. or more that is corrosive such that the substance corrodes interior walls of the vessel.

8. The corrosion detection system of claim 1, wherein the vessel is, or comprises, a pipe, a pipe assembly, a pipeline, a storage tank, or a storage container.

9. The corrosion detection system of claim 1, wherein the transmit sensor, the receive sensor, or both, are single-element piezoelectric crystal sensors made from piezoelectric materials.

10. The corrosion detection system of claim 1, wherein the transmit sensor, the receive sensor, or both, are coated in high temperature-compatible electrodes capable of operating at temperatures of 500° C. or more.

11. The corrosion detection system of claim 1, wherein the transmit sensor and the receive sensor are attached directly to a surface of the vessel.

12. The corrosion detection system of claim 1, further comprising:
one or more waveguides for the transmit sensor, the receive sensor, or both, configured to reduce a respective temperature to which the transmit sensor, the receive sensor, or both, are exposed.

13. The corrosion detection system of claim 1, wherein acoustic wavelengths for modes in walls of the vessel are between 0.1 and 10 centimeters.

14. The corrosion detection system of claim 1, wherein the vessel is part of a molten salt reactor (MSR).

15. The corrosion detection system of claim 1, wherein the analysis by the control electronics comprises calculating a phase delay in a time window.

16. A corrosion detection system comprising:
a transmit sensor configured to produce and transmit a multi-mode acoustic signal;
a receive sensor configured to receive the transmitted signal from the transmit sensor after the transmitted signal passes through walls of a vessel, contents of the vessel, or both; and
control electronics configured to:
control operation of the transmit sensor via an excitation signal,
receive a signal detected by the receive sensor after the receive sensor receives the transmitted signal from the transmit sensor, and
perform time domain, frequency domain, or mixed time domain and frequency domain analysis of signal characteristics, signal delay, or both, between the transmitted multi-mode acoustic signal and the signal received from the receive sensor to determine wall loss of the vessel, physical properties of the contents of the vessel, or both, wherein
the transmit sensor, the receive sensor, or both, are broadband sensors having a ratio between low ($f_L$) and high ($f_H$) operational frequencies of less than or equal to 10.

17. The corrosion detection system of claim 16, wherein a center frequency, a frequency bandwidth, a signal duration, and/or a signal amplitude of the multi-mode acoustic signal generated by the transmit sensor excite and transmit the multiple acoustic modes in the vessel, the contents of the vessel, or both.

18. The corrosion detection system of claim 16, wherein
the corrosion detection system has sufficient sensitivity to detect vessel wall loss of 0.1%, a 1% change in density or viscosity of the contents of the vessel, or both, at temperatures of 500° C. or more, and
the contents of the vessel comprise a substance at a temperature of 500° C. or more that is corrosive such that the substance corrodes interior walls of the vessel.

19. The corrosion detection system of claim 16, further comprising:
one or more waveguides for the transmit sensor, the receive sensor, or both, configured to reduce a respective temperature to which the transmit sensor, the receive sensor, or both, are exposed.

20. A corrosion detection system comprising:
a transmit sensor configured to produce and transmit a multi-mode acoustic signal;
a receive sensor configured to receive the transmitted signal from the transmit sensor after the transmitted signal passes through walls of a vessel, contents of the vessel, or both;
at least one waveguide located between the transmit sensor and the vessel and at least one other waveguide located between the receive sensor and the vessel; and
control electronics configured to:
receive a signal detected by the receive sensor after the receive sensor receives the transmitted signal from the transmit sensor, and
perform time domain, frequency domain, or mixed time domain and frequency domain analysis on the signal received from the receive sensor to determine signal characteristics, signal delay, or both, in the multi-mode transmitted signal for a predetermined portion of the received signal at specific values of time delay and time span, and then estimate wall loss in the vessel, physical properties of the contents of the vessel, or both, based on the determined signal, wherein
the at least one waveguide and the at least one other waveguide are configured to reduce a temperature to which the transmit sensor and the receive sensor are exposed, respectively.

* * * * *